United States Patent
Estrada et al.

(10) Patent No.: US 9,825,563 B2
(45) Date of Patent: Nov. 21, 2017

(54) METHOD AND MEANS FOR DETECTING MOTOR ROTATION

(71) Applicant: FLOW CONTROL LLC., Beverly, MA (US)

(72) Inventors: Jesus Estrada, Gloucester, MA (US); Akshaykumar Patel, Beverly, MA (US)

(73) Assignee: Flow Control LLC, Beverly, MA (US)

( * ) Notice: Subject to any disclaimer, the term of this patent is extended or adjusted under 35 U.S.C. 154(b) by 0 days.

(21) Appl. No.: 14/860,202

(22) Filed: Sep. 21, 2015

(65) Prior Publication Data

US 2016/0099666 A1   Apr. 7, 2016

Related U.S. Application Data

(60) Provisional application No. 62/052,865, filed on Sep. 19, 2014, provisional application No. 62/073,324, (Continued)

(51) Int. Cl.
*H02P 6/16* (2016.01)
*H02P 6/17* (2016.01)
(Continued)

(52) U.S. Cl.
CPC .............. *H02P 6/17* (2016.02); *F04B 1/00* (2013.01); *F04B 43/02* (2013.01); *H02K 11/215* (2016.01);
(Continued)

(58) Field of Classification Search
CPC ... H02P 6/165; H02K 11/215; H02K 11/0021; H02K 11/33; H02K 11/01; H02K 15/02;
(Continued)

(56) References Cited

U.S. PATENT DOCUMENTS

| 3,679,954 A | 7/1972 | Hedrick |
| 3,894,252 A * | 7/1975 | Miwa ...................... H02K 7/09 310/114 |

(Continued)

FOREIGN PATENT DOCUMENTS

| DE | 19649675 | 7/1997 |
| EP | 1052764 | 11/2000 |

(Continued)

OTHER PUBLICATIONS

Cheok, Adrian David, and Ertugrul, Nesimi. "Computer-based automated test measurement system for determining magnetization characteristics of switched reluctance motors." Instrumentation and Measurement, IEEE Transactions on50.3 (2001): 690-696. http://digital.library.adelaide.edu.au/dspace/bitstream/2440/2394/1/hdl2394.pdf Discloses measuring the magnetization characteristics (flux linkage curves)—see p. 690.

(Continued)

*Primary Examiner* — Rita Leykin

(74) *Attorney, Agent, or Firm* — Ware, Fressola, Maguire & Barber LLP

(57) ABSTRACT

Apparatus features a microcontroller configured to: receive signaling containing information about a measured change of a magnetic field created by a magnetic circuit driving a motor; and determine corresponding signaling containing information about the speed of rotation of the motor, based upon the signaling received. The microcontroller provides control signaling containing information to control the operation of the motor, including where the motor control is used to control the flow of fluids from a pump. A Hall Effect Sensor is used to sense the magnetic flux and provide the signaling in the form of a feedback signal for implementing motor control. The motor housing has a slot, the Hall Effect sensor is mounted external the motor housing over the slot, and a ferromagnetic bridge is arranged over the Hall Effect sensor to close the magnetic circuit and cause more flux to go through the Hall Effect sensor.

22 Claims, 17 Drawing Sheets

Hall Effect sensor mounted externally on the motor.

Related U.S. Application Data filed on Oct. 31, 2014, provisional application No. 62/114,730, filed on Feb. 11, 2015.

(51) Int. Cl.
    *H02K 11/215*     (2016.01)
    *F04B 1/00*     (2006.01)
    *F04B 43/02*     (2006.01)

(52) U.S. Cl.
    CPC ........ *H02P 6/16* (2013.01); *F04B 2203/0203* (2013.01)

(58) Field of Classification Search
    CPC .......... H02K 15/06; H02K 3/47; H02K 7/063; F04B 9/00; G01D 5/00; F04D 25/0653; F04D 29/281; F04D 29/30; F04D 25/0606; F04D 25/082; Y10S 310/06
    USPC ......... 318/400.04, 400.01, 700, 727, 400.38, 318/400.24; 310/81, DIG. 6, 156.32, 310/156.53, 179, 63, 68 R, 71; 417/354, 417/410.1
See application file for complete search history.

(56) References Cited

U.S. PATENT DOCUMENTS

| | | | |
|---|---|---|---|
| 4,459,087 A | 7/1984 | Barge | |
| 4,563,622 A | 1/1986 | Deavers et al. | |
| 4,628,441 A * | 12/1986 | Johnstone | G05B 19/232 318/603 |
| 4,745,345 A * | 5/1988 | Petersen | H02P 6/085 310/68 R |
| 4,895,497 A | 1/1990 | Schlinkheider | |
| 5,044,897 A | 9/1991 | Dorman | |
| 5,139,044 A * | 8/1992 | Otten | A01G 25/16 137/62 |
| 5,441,389 A | 8/1995 | Wolcott et al. | |
| 5,482,438 A | 1/1996 | Anderson et al. | |
| 5,482,446 A | 1/1996 | Williamson et al. | |
| 5,630,710 A | 5/1997 | Tune | |
| 5,658,133 A | 8/1997 | Anderson | |
| 5,670,876 A * | 9/1997 | Dilger | G01D 5/147 324/207.13 |
| 5,791,880 A | 8/1998 | Wilson | |
| 5,924,975 A | 7/1999 | Goldowsky | |
| 5,982,169 A | 11/1999 | Furlani et al. | |
| 6,065,946 A | 5/2000 | Lathrop | |
| 6,104,152 A | 8/2000 | Coles et al. | |
| 6,124,688 A | 9/2000 | Coles et al. | |
| 6,181,036 B1 * | 1/2001 | Kazama | G01D 5/145 310/67 R |
| 6,225,770 B1 | 5/2001 | Heinrich et al. | |
| 6,286,055 B1 * | 9/2001 | Yamazaki | G05B 19/404 318/561 |
| 6,373,241 B1 * | 4/2002 | Weber | G01D 5/145 310/68 B |
| 6,460,567 B1 * | 10/2002 | Hansen, III | F16K 31/04 137/554 |
| 6,557,412 B1 | 5/2003 | Barbier et al. | |
| 6,597,139 B1 | 7/2003 | Klesing | |
| 6,652,249 B2 | 11/2003 | Kenney et al. | |
| 6,693,422 B2 | 2/2004 | Lutz | |
| 6,791,219 B1 | 9/2004 | Eric et al. | |
| 6,822,410 B2 | 11/2004 | Whinnery et al. | |
| 6,891,343 B2 * | 5/2005 | Petersen | H02K 21/12 318/400.11 |
| 6,998,813 B2 | 2/2006 | Heizmann et al. | |
| 7,026,773 B2 * | 4/2006 | Petersen | H02K 21/12 318/400.01 |
| 7,095,193 B2 | 8/2006 | Kellogg et al. | |
| 7,170,278 B2 * | 1/2007 | Wohner | F16D 25/088 324/207.2 |
| 7,173,354 B2 * | 2/2007 | Kim | H02K 7/063 310/156.32 |
| 7,174,093 B2 | 2/2007 | Kidd | |
| 7,190,145 B2 | 3/2007 | Grand | |
| 7,298,395 B2 * | 11/2007 | Fukaya | G01D 5/145 348/149 |
| 7,414,392 B2 | 8/2008 | Parenti | |
| 7,626,295 B2 * | 12/2009 | Yamaguchi | F04D 29/281 310/156.32 |
| 7,746,063 B2 | 6/2010 | Sabini et al. | |
| 7,800,325 B2 * | 9/2010 | Song | G01P 3/48 318/400.01 |
| 7,866,732 B2 | 1/2011 | Oxley | |
| 7,887,505 B2 | 2/2011 | Flaherty | |
| 8,083,557 B2 | 12/2011 | Sullivan | |
| 8,167,593 B2 | 5/2012 | Gohean et al. | |
| 8,193,748 B2 | 6/2012 | Deller et al. | |
| 8,304,939 B2 | 11/2012 | Lee et al. | |
| 8,324,892 B2 | 12/2012 | Rudel et al. | |
| 8,366,401 B2 | 2/2013 | Pate et al. | |
| 8,386,040 B2 | 2/2013 | Pate et al. | |
| 8,568,113 B2 | 10/2013 | Pate et al. | |
| 8,579,884 B2 | 11/2013 | Lanier et al. | |
| 8,692,492 B2 * | 4/2014 | Sato | H02P 6/06 123/406.24 |
| 8,810,169 B2 | 8/2014 | Thyagarajan | |
| 8,844,679 B2 | 9/2014 | Conley et al. | |
| 8,920,144 B2 | 12/2014 | Rotem et al. | |
| 8,967,780 B2 * | 3/2015 | Tomoguchi | B41J 2/17513 347/19 |
| 9,144,929 B2 * | 9/2015 | Tan | B29C 45/281 |
| 9,331,544 B2 * | 5/2016 | Okinaga | H02K 3/522 |
| 2002/0021124 A1 | 2/2002 | Schott et al. | |
| 2008/0008609 A1 | 1/2008 | Pate et al. | |
| 2008/0272664 A1 | 11/2008 | Flynn | |
| 2008/0298784 A1 | 12/2008 | Kastner | |
| 2009/0035121 A1 | 2/2009 | Watson | |
| 2009/0060761 A1 * | 3/2009 | Winterhalder | H02K 29/08 417/410.1 |
| 2010/0244776 A1 | 9/2010 | Leonard | |
| 2010/0268333 A1 | 10/2010 | Gohean et al. | |
| 2011/0116952 A1 | 5/2011 | Yi et al. | |
| 2012/0076667 A1 | 3/2012 | Patient | |
| 2012/0105055 A1 * | 5/2012 | Takahashi | F16C 41/007 324/207.25 |
| 2012/0209085 A1 | 8/2012 | Degen | |
| 2012/0209165 A1 | 8/2012 | Degen | |
| 2012/0224987 A1 | 9/2012 | Jones | |
| 2013/0081718 A1 | 4/2013 | Ubidia | |
| 2013/0088361 A1 | 4/2013 | Pike | |
| 2013/0320894 A1 * | 12/2013 | Hsu | H02P 6/001 318/400.21 |
| 2013/0336814 A1 | 12/2013 | Kamen et al. | |
| 2014/0058190 A1 | 2/2014 | Gohean | |
| 2014/0142556 A1 | 5/2014 | Kuo et al. | |
| 2014/0145564 A1 * | 5/2014 | Taniguchi | H02K 11/0021 310/68 B |
| 2014/0191624 A1 | 7/2014 | Jahshan | |
| 2014/0203746 A1 | 7/2014 | Linder | |
| 2014/0221913 A1 | 8/2014 | Banister et al. | |
| 2014/0252904 A1 * | 9/2014 | Mikami | H02K 1/243 310/156.66 |
| 2015/0160660 A1 | 6/2015 | Winkler et al. | |

FOREIGN PATENT DOCUMENTS

| | | |
|---|---|---|
| EP | 2704299 | 3/2014 |
| KR | 20140098924 | 8/2014 |
| WO | 2009038302 | 3/2009 |

OTHER PUBLICATIONS

Fleming, William J. "Overview of automotive sensors." Sensors Journal, IEEE1.4 (2001): 296-308. http://memsjournal.typepad.com/sensorshub/pdfs/overviewofautomotivesensors.pdf disclosing measuring rotation by sensing flux variations—see p. 299.

(56) References Cited

OTHER PUBLICATIONS

Vukosavic, Slobodan N., and Stankovic, Aleksandar M. "Sensorless Induction Motor Drive with a Single DC-Link Current Sensor and Instantaneous Active and Reactive Power Feedback." IEEE Transactions on Industrial Electronics 48.1 (2001): 195. http://www.ece.neu.edu/faculty/stankovic/Jour_papers/ie201.pdf Discloses measuring flux in shaft rotation with Hall-effect sensor—see p. 203.
Uddin, M. Nasir, and M. Azizur Rahman. "Fuzzy logic based speed control of an IPM synchronous motor drive." Electrical and Computer Engineering, 1999 IEEE Canadian Conference on. vol. 3. IEEE, 1999. http://ieeexplore.ieee.org/xpl/login.jsp?tp=&arnumber=804872&url=http%3A%2F%2Fieeexplore.ieee.org%2Fxpls%2Fabs_all.jsp%3Farnumber%3D804872 Disclosing deriving speed by measuring variations in flux.
Rigoni, M., et al. "Detection and analysis of rotor faults in induction motors by the measurement of the stray magnetic flux." Journal of Microwaves, Optoelectronics and Electromagnetic Applications 11.1 (2012): 68-80. http://www.scielo.or/pdf/jmoea/v11n1/a06v11n1.pdf Measuring flux variations in rotating shaft woth Hall-effect sensors—see p. 76.
Brodgesell, A., and BG LIPTAK. "7.19 Tachometers and Angular Speed Detectors." (2003). ftp://ftp.ucauca.edu.co/Documentos_Publicos/Facultades/FIET/DEIC/Materias/Instru mentacion%20Industrial/Instrument_Engineers_Handbook_-_Process_Measurement_and_Analysis/Instrument%20Engineers%20Handbook%20-%20Process%20Measurement%20and%20Analysis/1083ch7_19.pdf Disclosing hall-effect sensors to measure flux variations—see page 1042.
DE19649675 English Language Abstract (1 page).
Gamazo-Real, José Carlos, Vazquez-Sanchez Ernesto, and Gomez-Gil Jaime. "Position and speed control of brushless DC motors using sensorless techniques and application trends." Sensors 10.7 (2010): 6901-6947. See http://www.mdpi.com/1424-8220/10/7/6901/htm, which discloses measuring rotational speed with hall-effect sensors (Section 2.1 on p. 2 registering magnet flux changes on pp. 3-4 and 7).
Hsieh, Min-Fu, and Liao, Hung-Ju. "Awide speed range sensorless control technique of brushless DC motors for electric propulsors." Journal of Marine Science and Technology 18.5 (2010): 735-745. See http://jmst.ntou.edu.tw/marine/18-5/735-745.pdf, which discloses employing Hall-effect flux measurements as an alternative to complex back-EMF (Figures 11-12 on p. 741-744).
Ramesh, M. V., et al. "Speed control of brushless DC motor by using fuzzy logic PI controller." ARPN Journal of Engineering and Applied Sciences 6.9 (2011): 55-62. See http://www.arpnjournals.com/jeas/research_papers/rp_2011/jeas_0911_555.pdf, which discloses hall sensors measuring magnetic flux (Figure 2 on p. 56).
Narwal, Pardeep, and Gupta, Umesh. "Review Paper on Brushless Direct Current Motor and their speed control with hall sensors." International Journal of Enhanced Research in Science Technology and Engineering, vol. 3, Issue 6, Jun. 2014, pp. 232-236. See http://www.erpublications.com/uploaded_files/download /download_28_06_2014_18_17_11.pdf, which discloses hall sensors as alternative to back-EMF (Figure 2 on p. 233).
Brodgesell, A., and BG Liptak. "7.19 Tachometers and Angular Speed Detectors." (2003). See ftp://ftp.ucauca.edu.co/Documentos_Publicos/Facultades/FIET/DEIC/Materias/Instru mentacion%20Industrial/Instrument_Engineers_Handbook_-_Process_Measurement_and_Analysis/Instrument%20Engineers%20Handbook%20-%20Process%20Measurement%20and%20Analysis/1083ch7_19.pdf, which discloses hall-effect sensors to measure flux variations—see p. 1042.
KR20140098924 English Language Abstract (1 page).
EP2704299 English Language Machine Translation (14 Pages).
Schauder, Colin. "Adaptive speed identification for vector control of induction motors without rotational transducers." Industry applications, IEEE Transactions on 28.5 (1992): 1054-1061. http://www2.elo.utfsm.cl/~elo386/apuntes/00158829.pdf Disclosing a "rotor flux observer" (p. 1058-1060; Figures 10(a)-(b) and 12), evidently employing measured variance as calibration.
Kubota, Hisao, Kouki Matsuse, and Takayoshi Nakano. "DSP-based speed adaptive flux observer of induction motor." IEEE Transactions on Industry Applications 29.2 (1993): 344-348. http://blog.dianyuan.com/blog/u/54/1183203400.pdf Discloses estimating rotor flux and related speed of an induction morot based on the adaptive control theory (Figure 4 on p. 346).
Lidozzi, Alessandro, et al. "SVM PMSM drive with low resolution Hall-effect sensors." Power Electronics, IEEE Transactions on 22.1 (2007): 282-290. http://www.researchgate.net/publication/3281053_SVM_PMSM_Drive_With_Low_Resolution_Hall-Effect_Sensors/file/5046352a1a106d8100.pdf Disclosing a Speed Estimator based on Rotor Frame (SERF) machine model employing Hall-effect sensors positioned to self-correct (pp. 283-284).
Heremans, J., et al. "Narrow-gap semiconductor magnetic-field sensors and applications." Semiconductor Science and Technology 8.1S (1993): S424. https://filebox.ece.vt.edu/~LiaB/ECE4234/Papers/Heremans_ 1993%20Narrowgap%20semiconductor%20magnetic-field%20sensors.pdf Discloses Hall sensors positioned to detect changes in magnetic flux and calculate speed (Figure 1 on the 2nd Page).
Zai, Li-Cheng, Christopher L. Demarco, and Thomas A. Lipo. "An extended Kalman filter approach to rotor time constant measurement in PWM induction motor drives." Industry Applications, IEEE Transactions on 28.1 (1992): 96-104. http://minds.wisconsin.edu/bitstream/handle/1793/8652/file_1.pdf?sequence=1 Discloses determining speed by filtering flux measurements (p. 100).
Kumar, Kottala Kiran, S. Sasikanth, and L. Dinesh. "Simulation of Sensorless Induction Motor Based on Model Reference Adaptive System (MRAS)." Simulation 2.6 (2012): 255-260. http://www.academia.edu/download/30844862/AO26255260.pdf Disclosing a Rotor flux estimation scheme applied to a Model Reference Adaptive System algorithm as a state estimator in lieu of direct measurement to estimate rotor speed.

* cited by examiner

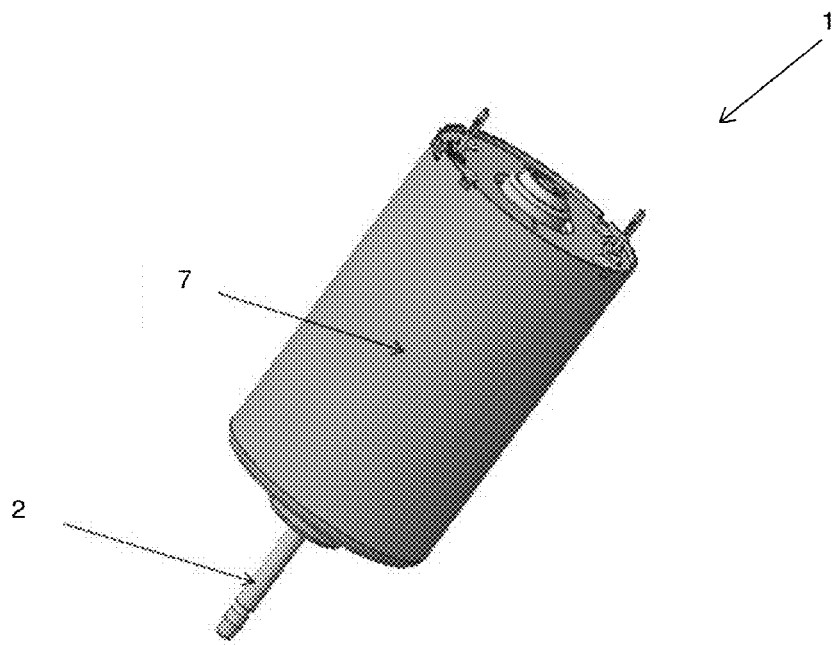
Figure 1 (Prior art) - Typical motor to which this technology may be applied.
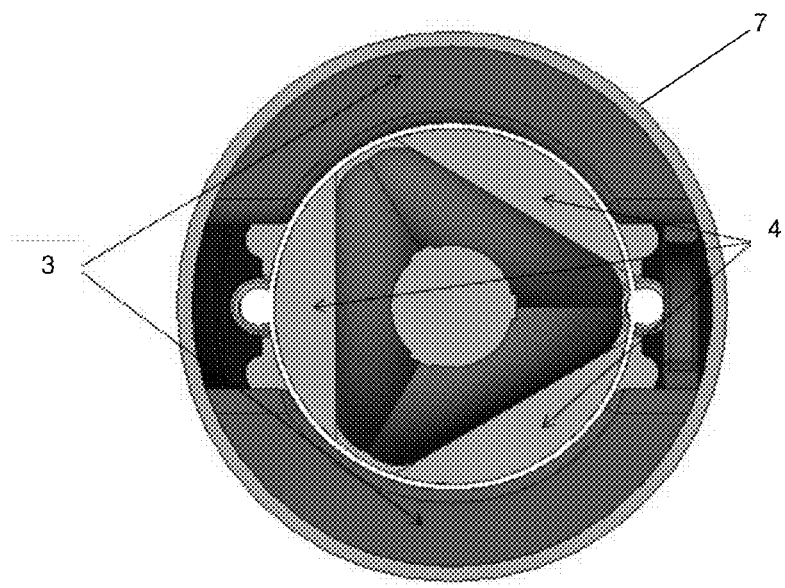
Figure 2 (Prior Art) - The inside of the motor in Figure 1 showing the core and permanent magnets.

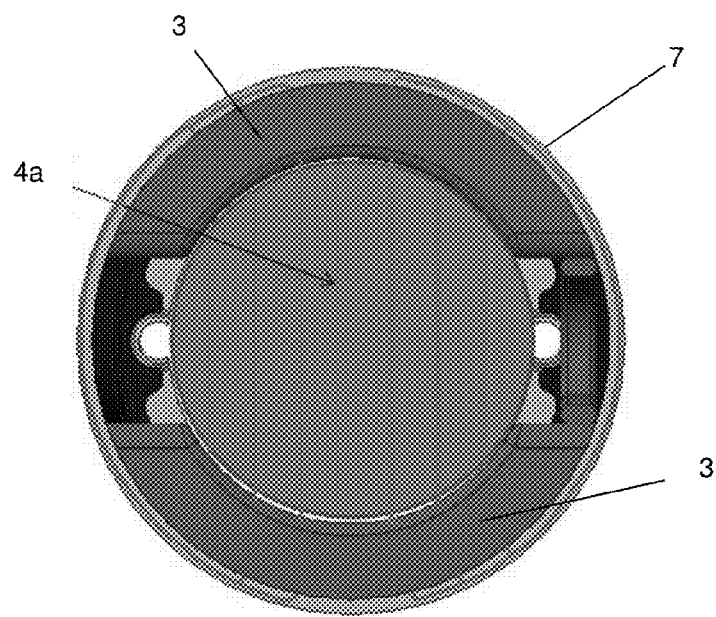
Figure 3 (Prior Art) - Magnetic flux through an ideal motor.
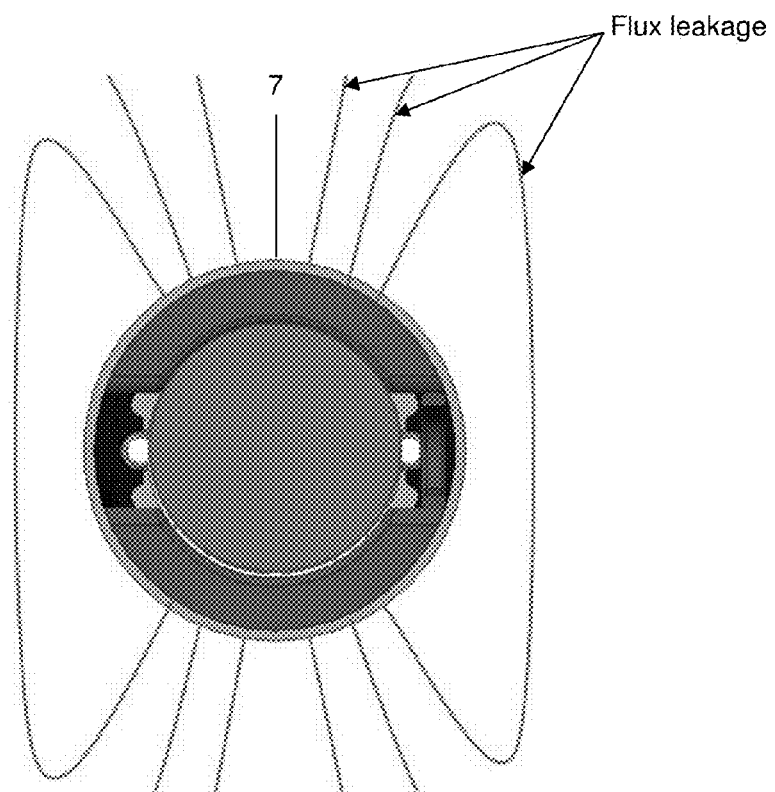
Figure 4 (Prior Art) - Flux leakage outside of the motor in a real (non-ideal) motor.

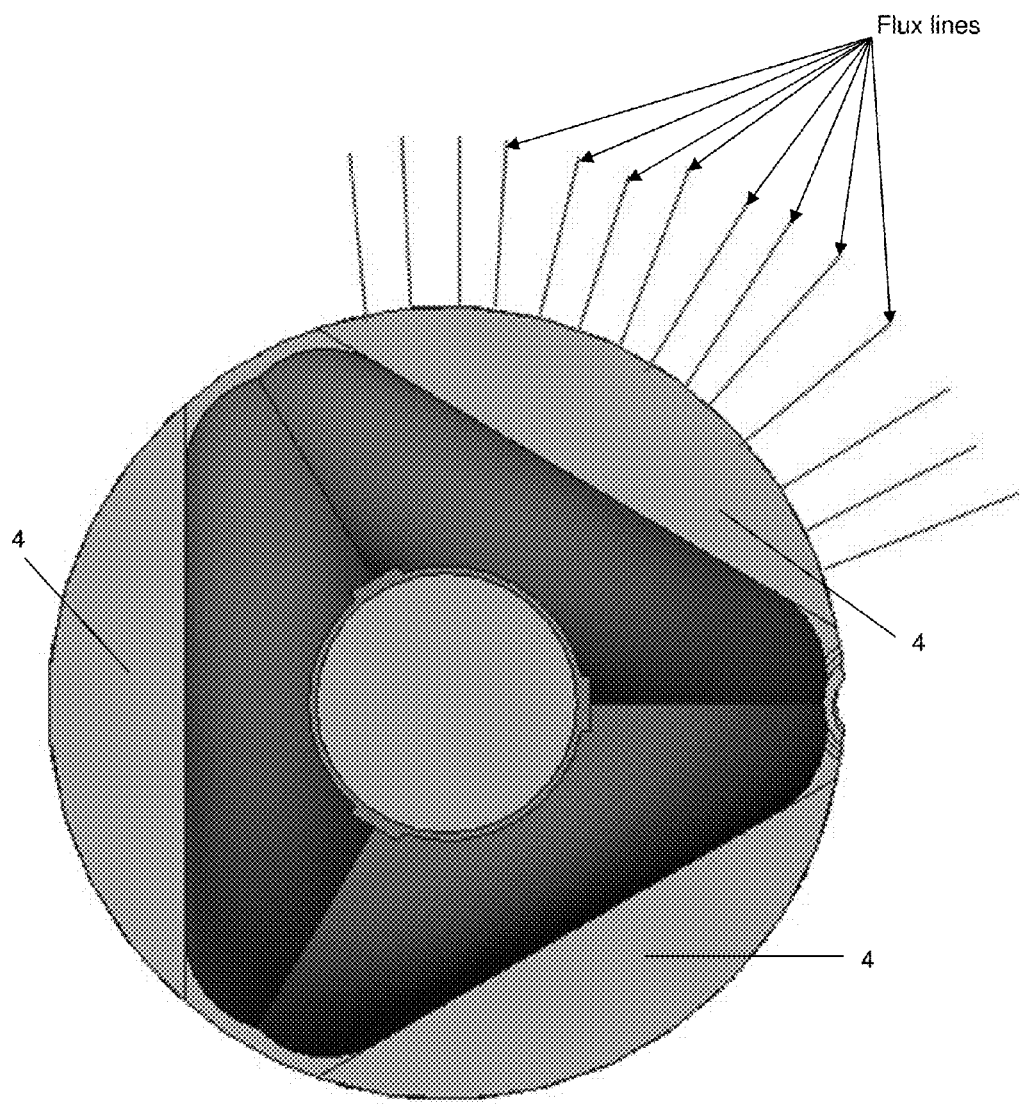
Figure 5 (Prior Art) - Flux lines leaving a typical core configuration.

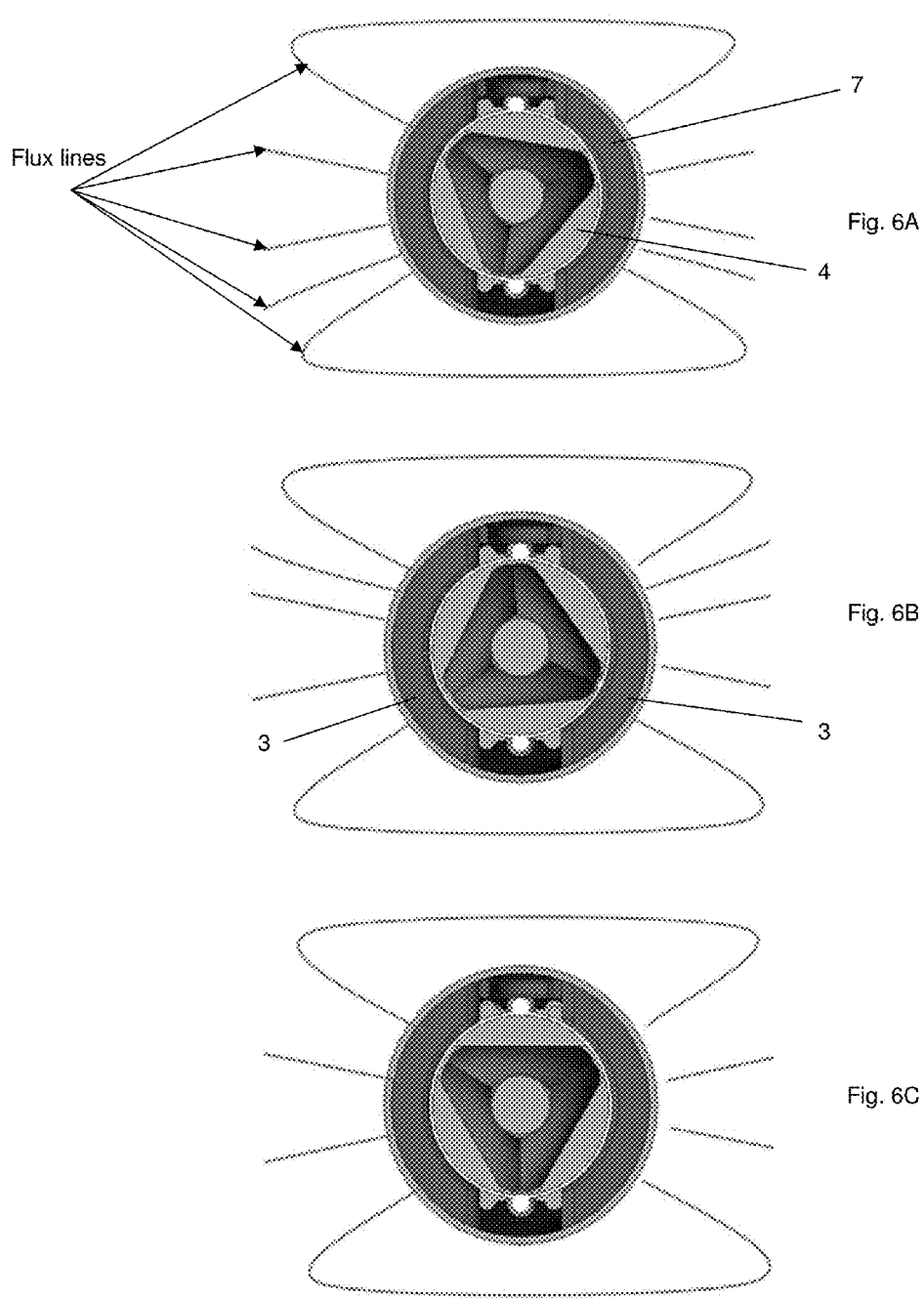
Figure 6 (Prior Art) - Flux patterns outside the motor housing as the core rotates through three different angular positions.

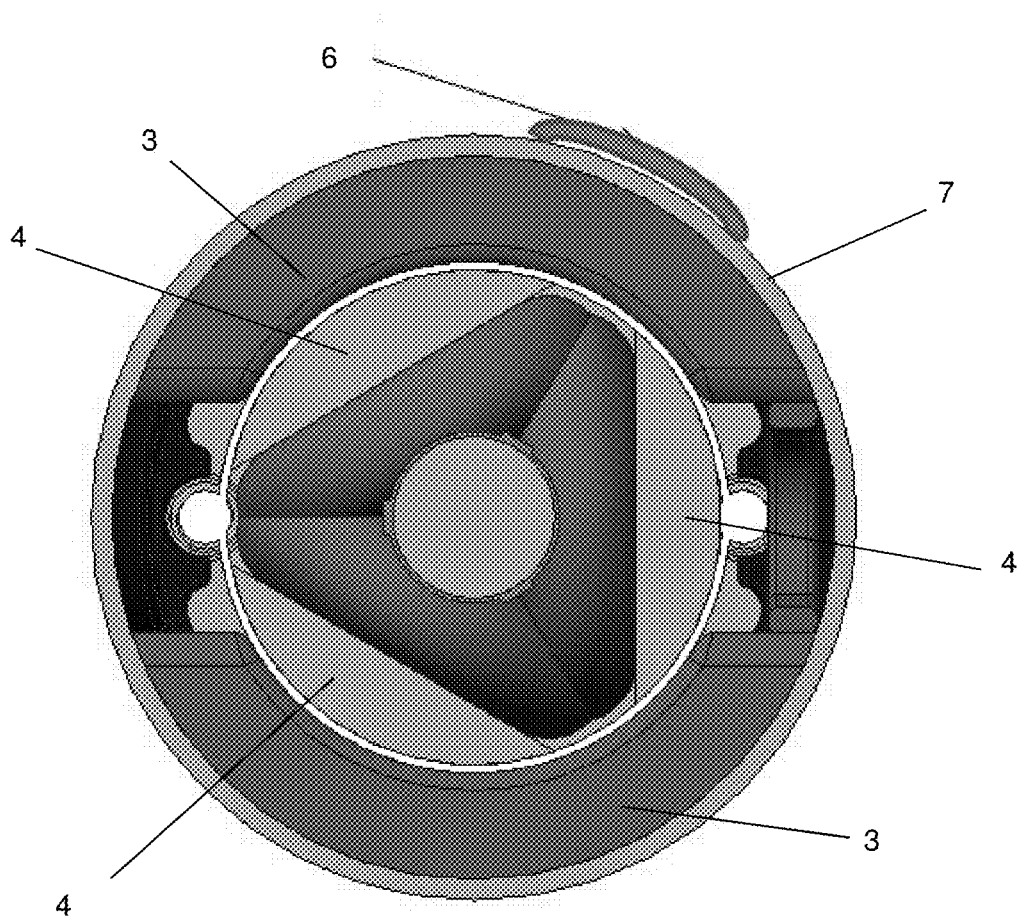
Figure 7 - Hall Effect sensor mounted externally on the motor.

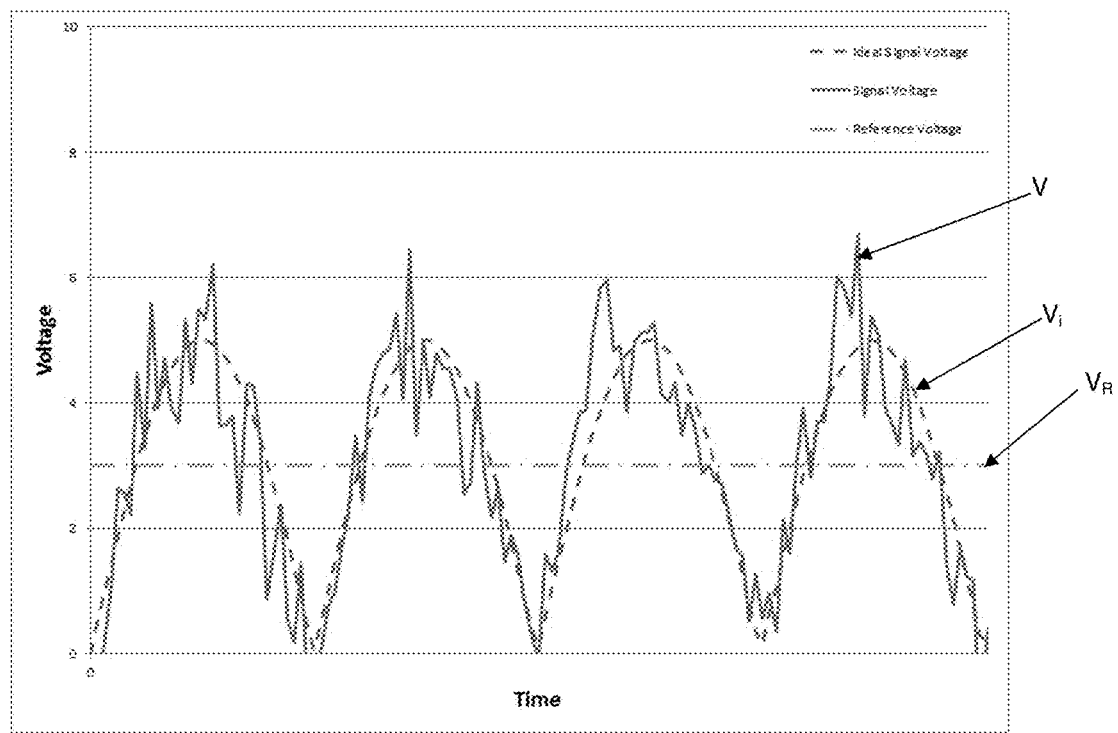
Figure 8 - Hall Effect sensor signal V, an ideal signal $V_i$, and a reference voltage $V_R$.

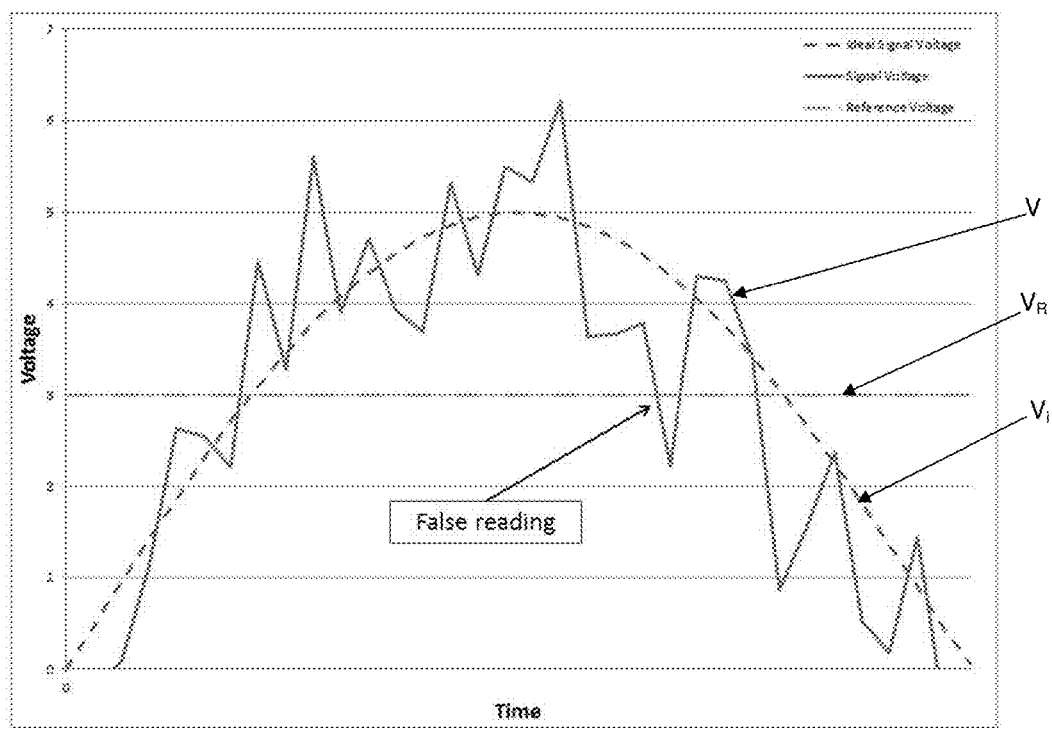
Figure 9 - First cycle of Hall Effect sensor signal with random noise showing a false reading

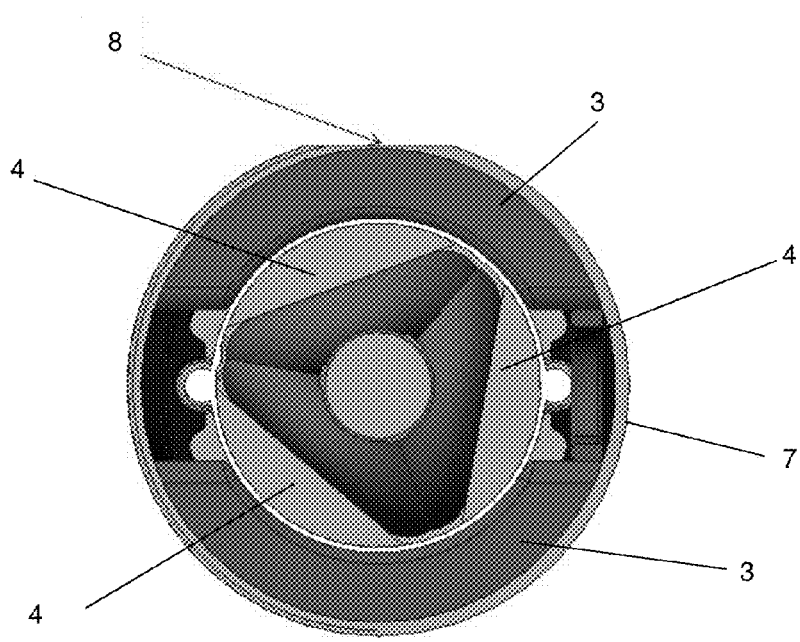
Figure 10 - Slot to allow magnetic flux leakage through the motor housing.
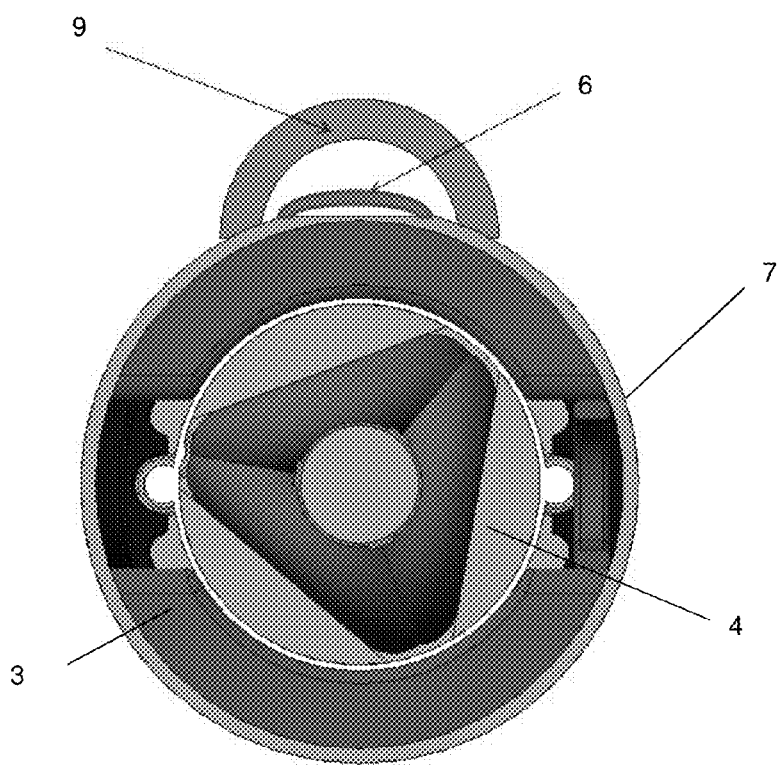
Figure 11 - Magnetic bridge closes the magnetic circuit and causes more flux to go through the Hall Effect sensor.

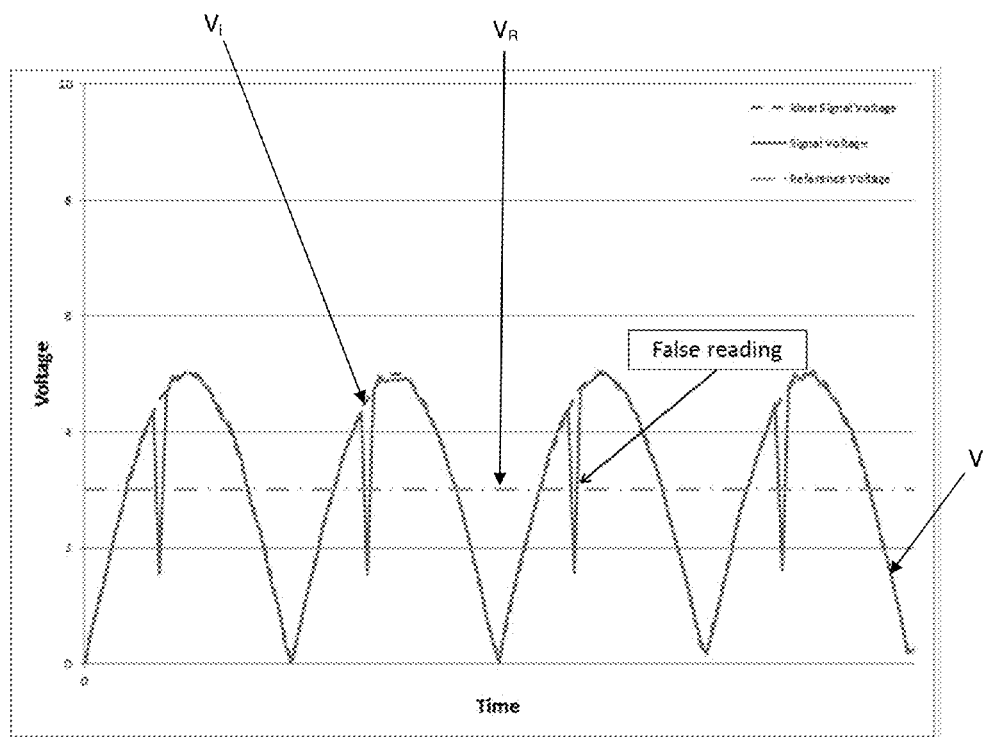
Figure 12 - Dips in the signal caused by commutation that cause false readings

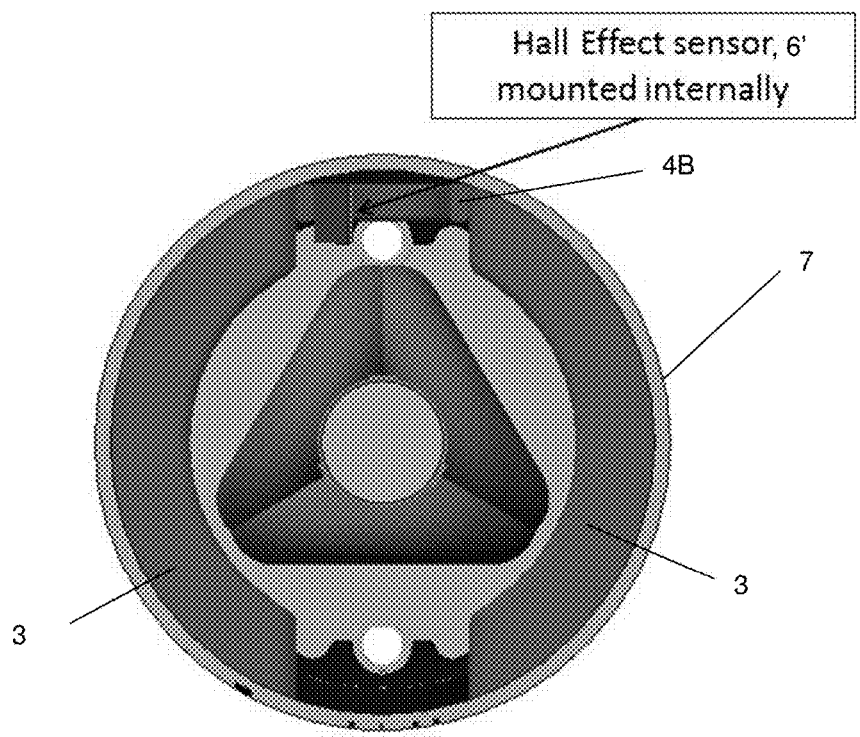
Figure 13 - The Hall Effect sensor is mounted internally to the motor.
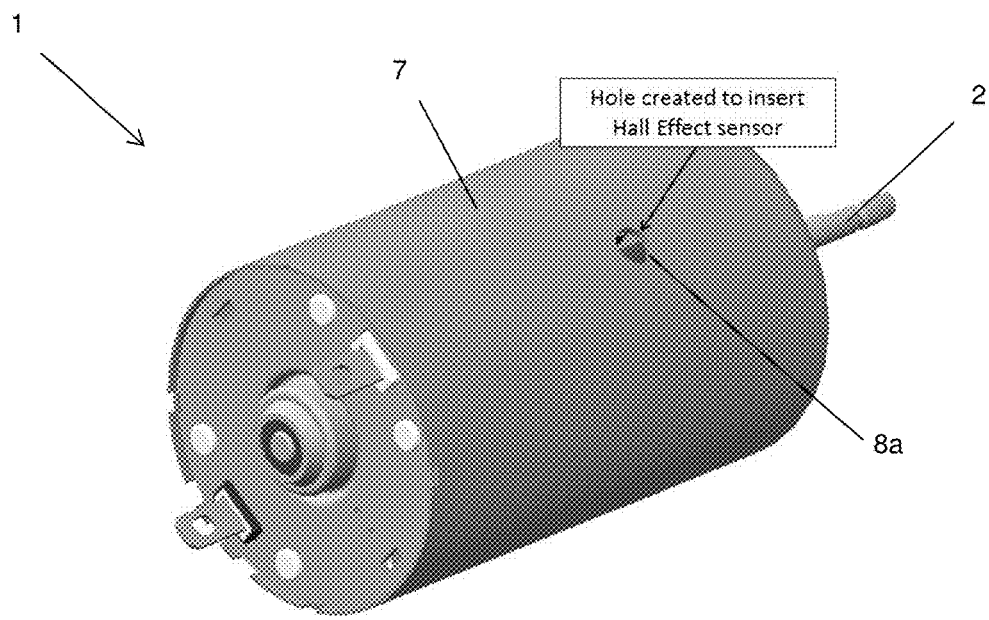
Figure 14 - Hole must be placed in motor housing for the internal mounting of the Hall Effect sensor

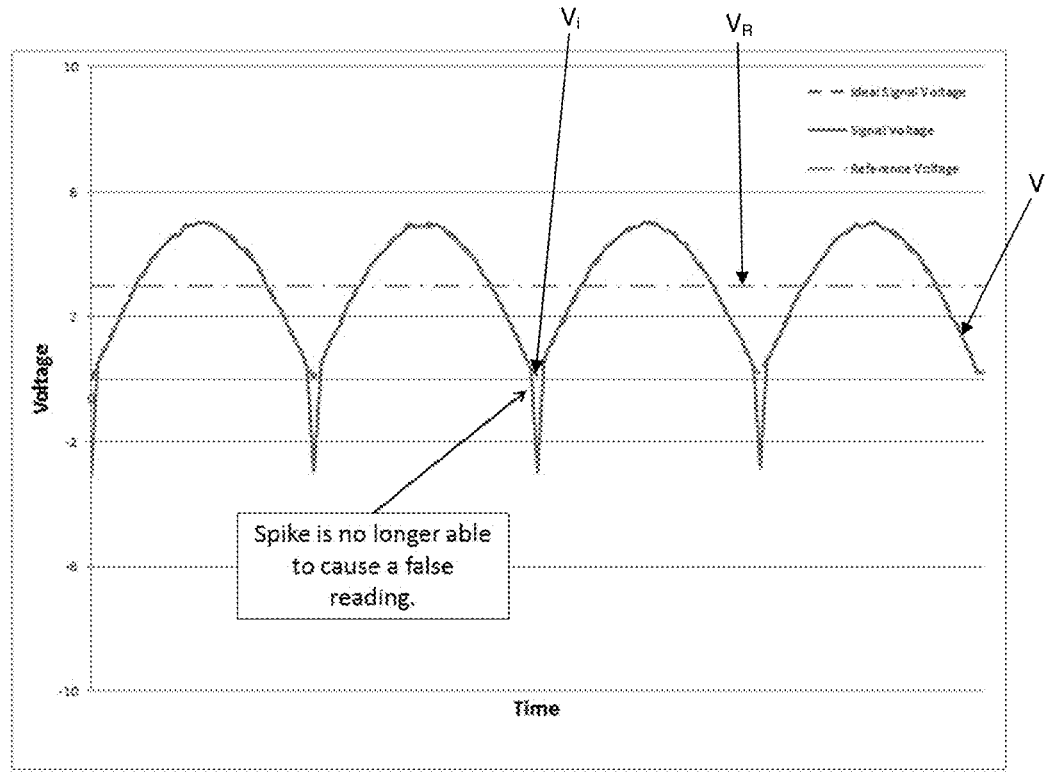
Figure 15 - The dip in the sensor reading caused by the motor commutation no longer affects the proper reading of the Hall Effect sensor by the microcontroller
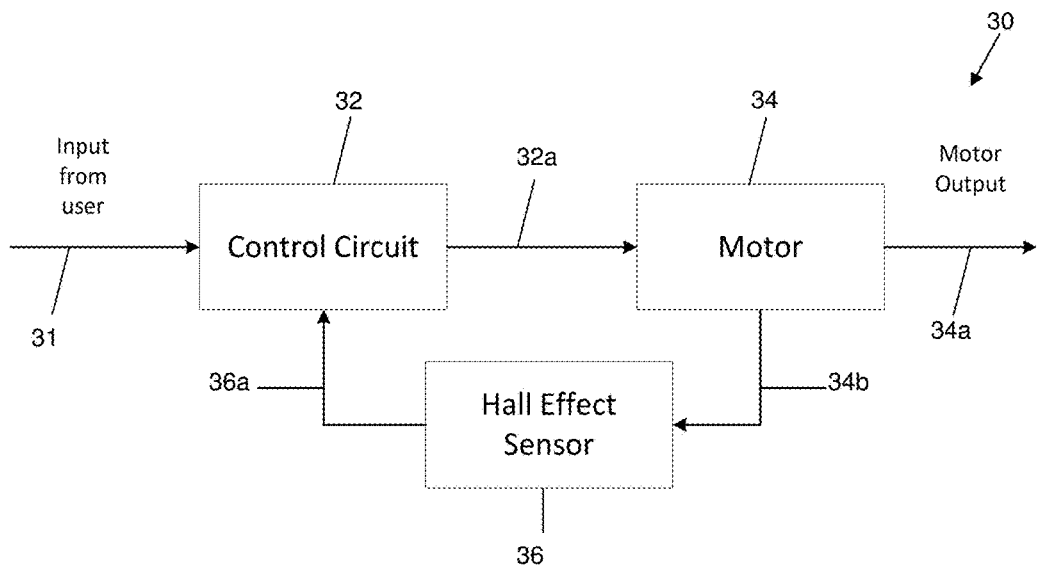
Figure 16 - Feedback loop for motor control.

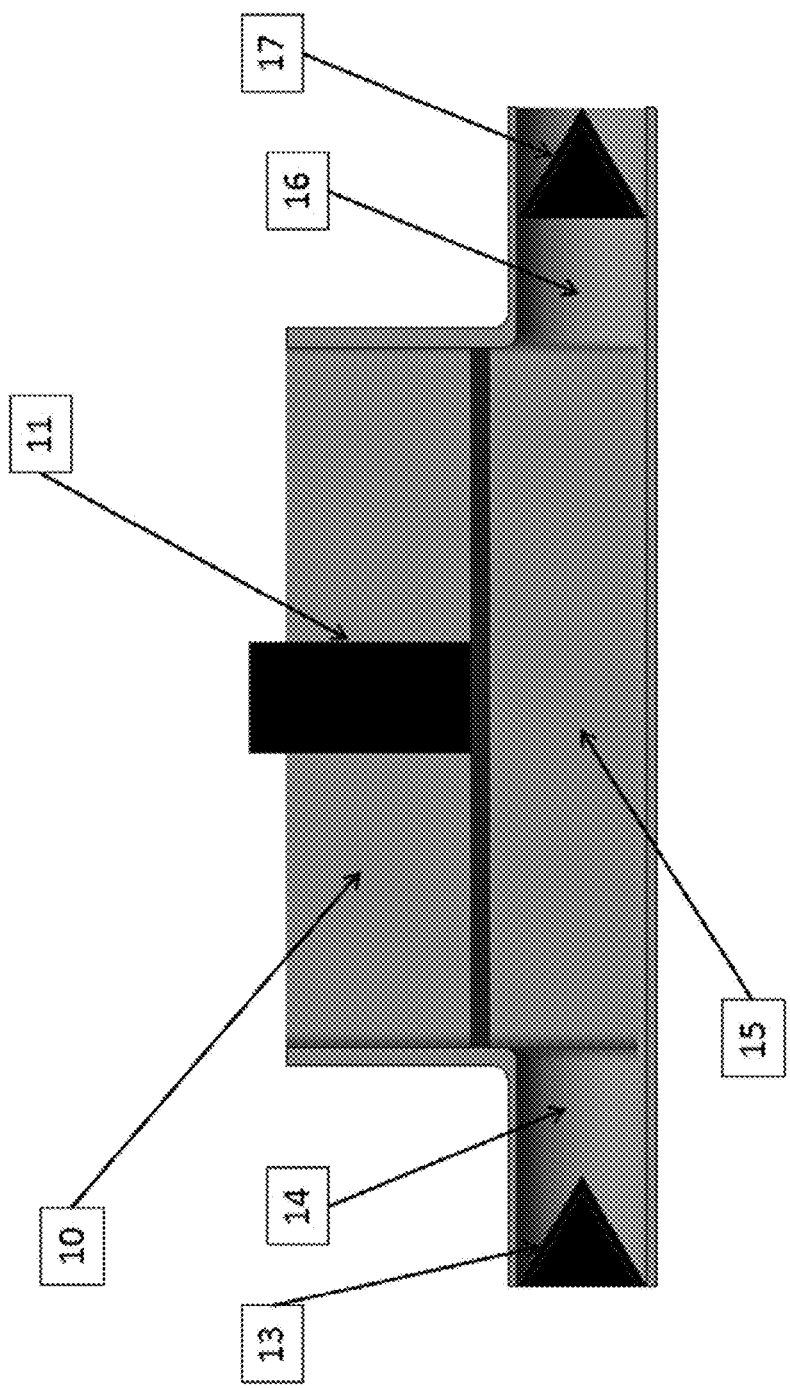
Figure 17 (Prior Art) - A simple, idealized diaphragm pump.

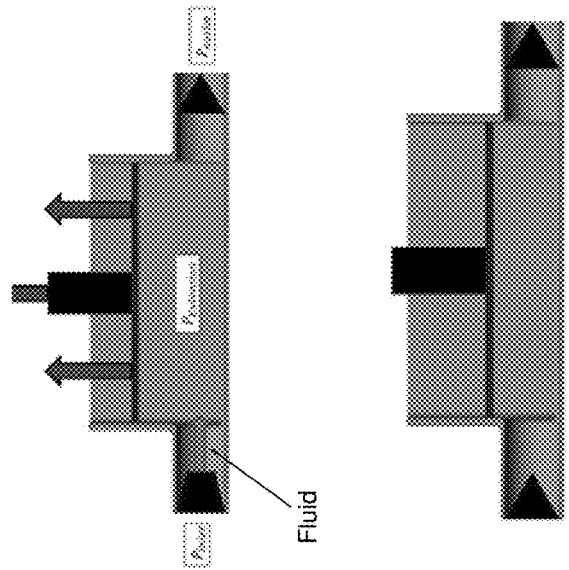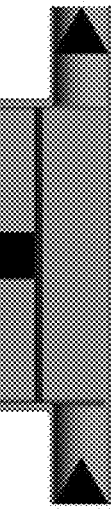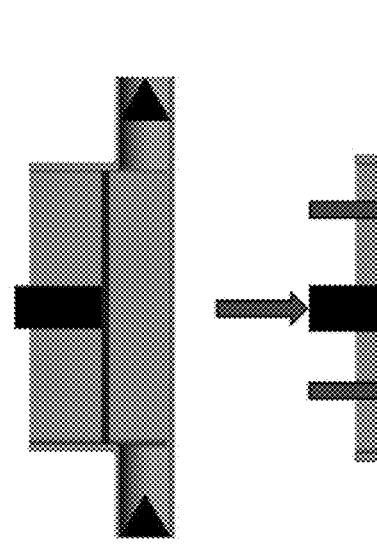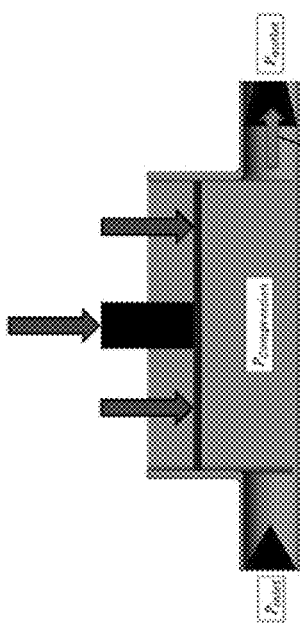
Figure 18 - (A) Pump at rest (B) Fluid enters the pump with positive vertical displacement of the diaphragm (C) Water exits the pump with negative vertical displacement of the diaphragm (D) The diaphragm returns to its original position.

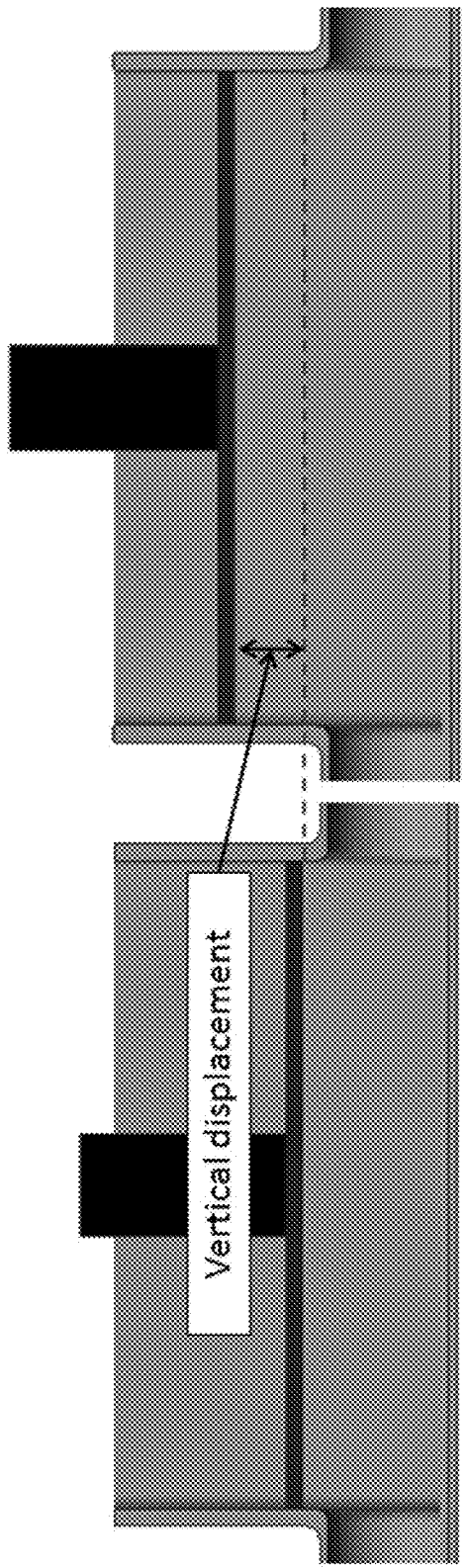
Figure 19 - The distance traveled by the diaphragm multiplied by the cross sectional area of the diaphragm is the amount of fluid displaced every cycle.

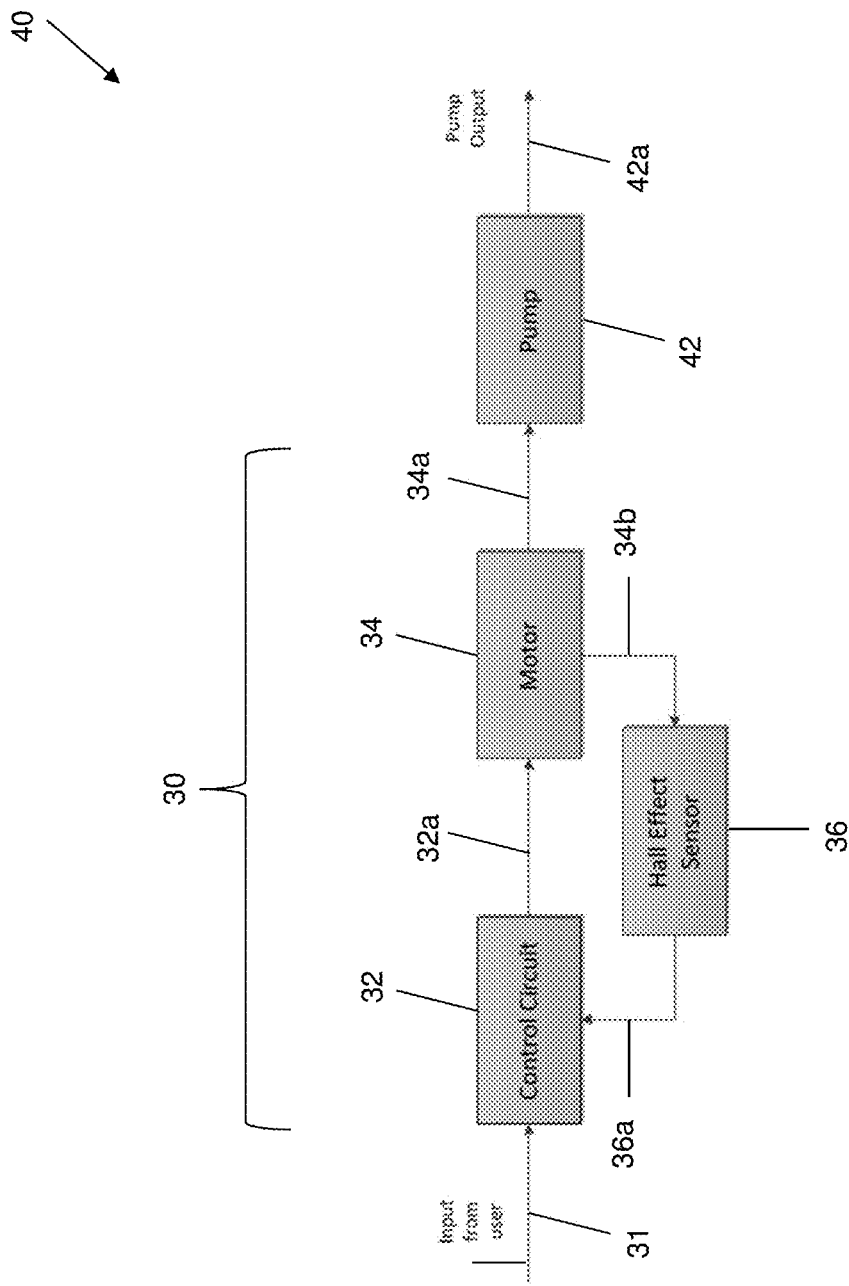
Figure 20 - Pump control system using Hall Effect sensor tracking method

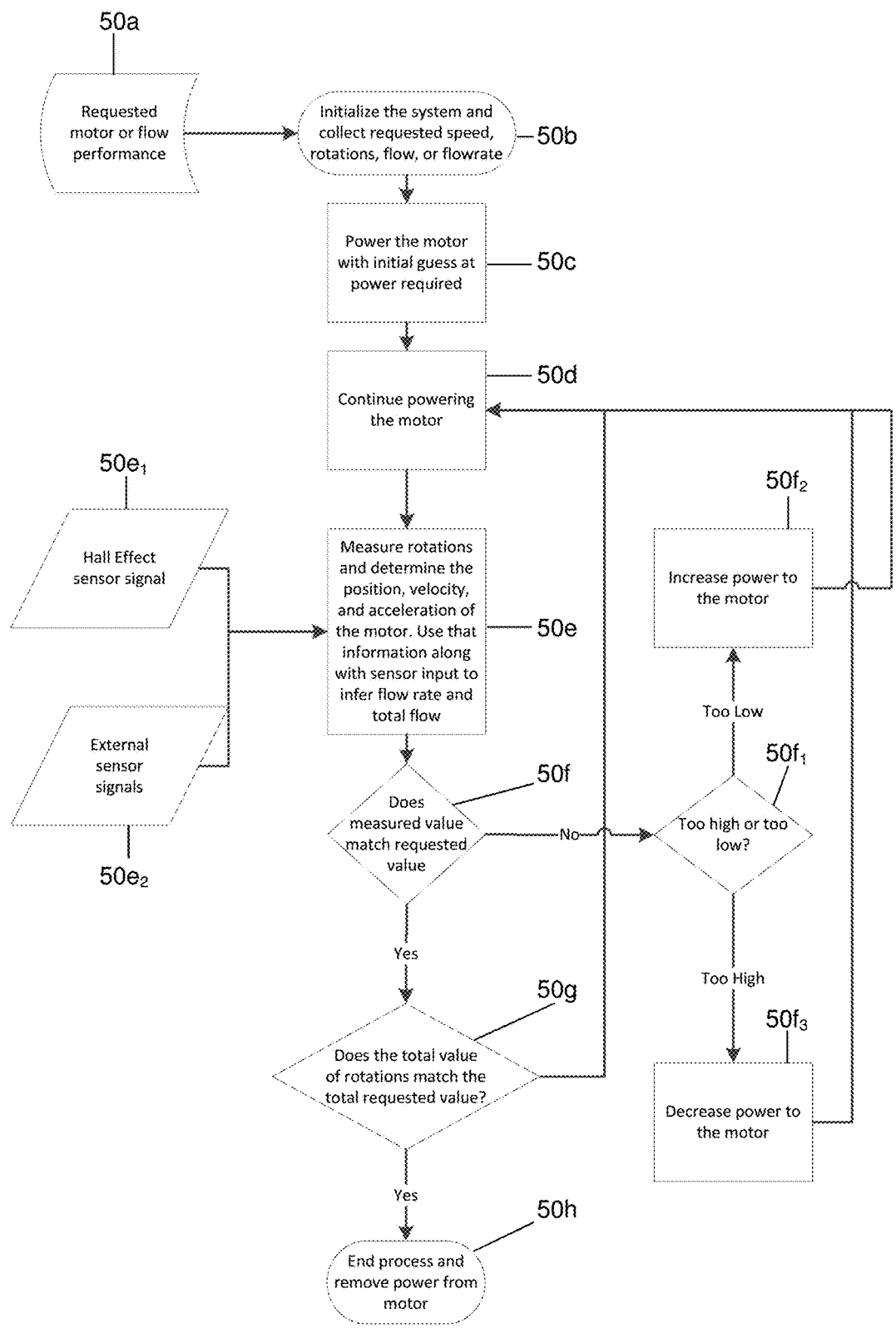
Figure 21 - Flow chart for control software.

Apparatus 100

Signal processor or processing module 102 configured at least to:

receive signaling containing information about a measured change of a magnetic field created by a magnetic circuit driving a motor...;

determine corresponding signaling containing information about the speed of rotation of the motor, based upon the signaling received; and/or provide corresponding signaling containing information to control the operation of the motor.

Other signal processor circuits or components 104 that do not form part of the underlying invention, e.g., including input/output modules, one or more memory modules, data, address and control busing architecture, etc.

Figure 22

METHOD AND MEANS FOR DETECTING MOTOR ROTATION

CROSS-REFERENCE TO RELATED APPLICATIONS

This application claims benefit to provisional patent application Ser. Nos. 62/052,865, filed 19 Sep. 2014; 62/073,324, filed 31 Oct. 2014; and 62/114,730, filed 11 Feb. 2015, which are all incorporated by reference in their entirety.

BACKGROUND OF THE INVENTION

1. Field of Invention

The present invention relates to a motor control technique; and more particularly relates to a motor control technique that can be used to control the flow of fluids from a pump.

2. Description of Related Art

There are many devices used to measure the rotation of a motor shaft.

A dynamometer measures the rotation of a motor shaft by mechanically coupling the shaft to a rotation sensor.

An encoder is another device which is mechanically coupled to the motor shaft. An encoder uses a patterned wheel which can contain holes for an optical sensor, magnets for a magnetic sensor, or contacts for an electric sensor. Another method to measure the rotation of a motor relies on the back EMF generated by the rotating core during the off time of a PWM voltage which is used to drive the motor, this method is described in US 20130081718 A1.

One problem with the known techniques used in the above mentioned devices, is that any device which is mechanically coupled to a motor, as is the case with the dynamometer and encoder, will require work from the motor to provide its motion. This work will increase the load on the motor. Another shortcoming is that these methods require external devices mechanically coupled to the motor shaft in order to operate. These external devices add extra cost and complexity to any system in which they are installed. There are also many situations in which the space requirements of the system preclude the use of any external devices mounted on the motor shaft.

The method described by US 20130081718 A1 using the back EMF of the rotating core to determine a motor's rotational speed has several shortcoming. It is sensitive to unwanted electrical noise, is dependent on measurements taken when the applied voltage is drastically changed, and also requires temperature correction due to the temperature dependency of the physical properties the system uses to infer motor rotation.

SUMMARY OF THE INVENTION

Examples of Particular Embodiments

According to some embodiments, and by way of example, the present invention may include, or take the form of, apparatus featuring a signal processor, microcontroller, or signal processing module configured at least to:
- receive signaling containing information about a measured change of a magnetic field created by a magnetic circuit driving a motor; and
- determine corresponding signaling containing information about the speed of rotation of the motor, based upon the signaling received.

By way of example, the apparatus may include one or more of the following features:

The signal processor, microcontroller, or signal processing module may be configured to provide the corresponding signaling as control signaling containing information to control the operation of the motor, including where the motor control is used to control the flow of fluids from a pump.

The apparatus may include, e.g., a Hall Effect Sensor configured to sense the magnetic flux and provide the signaling in the form of a feedback signal for implementing motor control. Other magnetic flux sensing devices may also be used instead.

The magnetic circuit may include some combination of a stator, a rotor, and a motor and a motor housing, including where the stator and the rotor comprises permanents magnets and ferromagnetic core, or where the stator is a wound stator, or where the motor is an AC or DC motor.

The apparatus may include a pump having the motor and also having a control system configured with the signal processor, microcontroller or signal processing module for controlling the dispensing of the flow of fluids from the pump.

The Hall Effect Sensor may be mounted externally to the motor housing and configured to sense some part of the magnetic field that leaves the motor housing, including being mounted on an external surface of the motor housing.

The signal processor, microcontroller, or signal processing module may be configured to determine the position of the ferromagnetic core by detecting the measured change of the magnetic field.

The apparatus may include a control circuit having the signal processor, microcontroller or signal processing module in combination with a Hall Effect Sensor in a feedback loop; and the Hall Effect Sensor may be configured to sense the measured change of the magnetic field created by the magnetic circuit driving the motor and provide the signaling containing information about the measured change.

The apparatus may include a pump configured to respond to the corresponding signaling and pump the fluid to be pumped, including where the pump is a piston or diaphragm pump.

The motor housing may be configured or formed with a slot therein that is cut into the motor housing to allow magnetic flux leakage through the motor housing, and the Hall Effect sensor may be configured, mounted or placed in relation to the slot to detect the magnetic flux leakage passing through the slot in the motor housing.

The magnetic circuit may include a ferromagnetic bridge configured or built above the Hall Effect sensor to close the magnetic circuit and cause more flux to go through the Hall Effect sensor contained between the ferromagnetic bridge and the motor housing. By way of example, the ferromagnetic bridge may be mounted on the motor housing above the Hall Effect sensor.

The Hall Effect Sensor may be mounted internally to the motor housing and configured to sense the magnetic field, including being mounted on an internal surface of the motor housing. By way of example, the motor housing may be configured or formed with a hole therein, and the Hall Effect sensor may be mounted internally inside the motor, including through the hole. The random noise acquired by the signal from the Hall Effect sensor may be minimized due to the motor housing acting as a protective shield, and the signal strength is maximized due to the proximity of the Hall Effect sensor with components creating the signal.

The apparatus may include a mounting assembly arranged in relation to the permanent magnets and the ferromagnetic core, and the Hall Effect sensor may be mounted to some part of the mounting assembly inside the motor housing.

The Method

According to some embodiments, the present invention may take the form of a method featuring steps for: receiving signaling containing information about a measured change of a magnetic field created by a magnetic circuit driving a motor; and determining corresponding signaling containing information about the speed of rotation of the motor, based upon the signaling received. The method may includes steps for implementing one or more of the other features set forth herein.

Solution to Problem in the Art

The present invention overcomes the above mentioned difficulties in the prior art device by measuring the rotation of a motor without the use of any external device mounted to the motor shaft. In addition, the system is low cost, simple, and can be incorporated into systems with limited space available.

The present invention also overcomes the difficulties of the method described in US 20130081718 A1. The method according to the present invention disclosed herein relies on measuring a change of physical properties instead of measuring their absolute value as is the case with the method outlined in US 20130081718 A1. This allows the measurement circuitry to be simpler and less susceptible to unwanted electrical noise. It also makes the system more robust to temperature change since the change in the physical properties being measured are much less dependent on temperature than the absolute physical properties being measured using the method described in US 20130081718 A1. In addition, there is no need to make drastic changes in applied voltage using the method according to the present invention disclosed herein as is otherwise required by the method in US 20130081718 A1, so that the present invention allows the motor rotation to be maintained at a more constant speed and produces a more accurate reading. In addition, the method described in US 20130081718 A1 requires the application of a pulse width modulated voltage, whereas the method according to the present invention disclosed herein can be applied regardless of the method of power application.

BRIEF DESCRIPTION OF THE DRAWING

The drawing includes FIGS. 1-22, which are not necessarily drawn to scale, which are briefly described as follows:

FIG. 1 is a diagram of a typical motor that is known in the art, and to which the technique according to the present invention may be applied.

FIG. 2 is a diagram of the inside of the motor in FIG. 1 showing a core and permanent magnets.

FIG. 3 is a diagram showing magnetic flux through an ideal motor.

FIG. 4 is a diagram showing flux leakage outside the motor in a real (non-ideal) motor.

FIG. 5 is a diagram showing flux lines leaving a typical core configuration of a motor.

FIG. 6 includes FIGS. 6A, 6B and 6C, showing flux patterns outside a motor housing as a core rotates through three different angular positions.

FIG. 7 is a diagram of a motor having a Hall Effect sensor mounted externally to the motor, according to some embodiments of the present invention.

FIG. 8 is a graph of voltage versus time showing a Hall Effect sensor signal V, an ideal signal $V_i$, and a reference voltage $V_R$.

FIG. 9 is a graph of voltage versus time showing a first cycle of Hall Effect sensor signal V with random noise showing a false signal, and also showing an ideal signal $V_i$, and a reference voltage $V_R$.

FIG. 10 is a diagram of a motor having a slot to allow magnetic flux leakage through the motor housing, according to some embodiments of the present invention.

FIG. 11 is a diagram of a motor having a magnetic bridge that closes a magnetic circuit and causes more flux to go through the Hall Effect sensor, according to some embodiments of the present invention.

FIG. 12 is a graph of voltage versus time showing dips in a Hall Effect sensor signal V caused by commutation that causes false readings, one of which is labeled and identified.

FIG. 13 is a diagram of a motor having a Hall Effect sensor mounted internally to the motor, according to some embodiments of the present invention.

FIG. 14 is a diagram of a motor having a hole placed in the motor housing for the internal mounting of the Hall Effect sensor, according to some embodiments of the present invention.

FIG. 15 is a graph of voltage versus time showing dips in a Hall Effect sensor signal caused by motor commutation no longer affects the proper reading of the Hall Effect sensor by the microcontroller.

FIG. 16 is a diagram of a motor system having a feedback loop for motor control, according to some embodiments of the present invention.

FIG. 17 is a diagram of a simple idealized diaphragm pump.

FIG. 18 includes FIG. 18A to FIG. 18D showing the diaphragm pump in FIG. 17, where FIG. 18A (A) shows the diaphragm pump at rest; FIG. 18B shows when fluid enters the pump with positive vertical displacement of the diaphragm; FIG. 18C shows when water exits the pump with negative vertical displacement of the diaphragm; and FIG. 18D shows when the diaphragm returns to its original position in FIG. 18A.

FIG. 19 includes FIGS. 19A and 19B showing the diaphragm pump in FIG. 17, where FIG. 19A shows the diaphragm pump at rest; and FIG. 19B shows the distance or vertical displacement traveled by the diaphragm, which can be multiplied by the cross sectional area of the diaphragm to determine the amount of fluid displaced every cycle.

FIG. 20 is a diagram of pump control system having the motor system shown in FIG. 16 arranged in relation to a pump, according to some embodiments of the present invention.

FIG. 21 is a diagram of a flow chart of steps to implement functionality for control software, according to some embodiments of the present invention.

FIG. 22 is a diagram of apparatus having a signal processor, microcontroller or signal processing module to implement functionality according to some embodiments of the present invention.

Not every element in every Figure is labeled with a lead line and reference numeral, so as to reduce clutter in the drawing.

DETAILED DESCRIPTION OF BEST MODE OF THE INVENTION

FIGS. 1-6: The Basic Motor Configuration

By way of example, FIG. 1 shows a typical motor 1 having a shaft 2, permanent magnets 3 and a ferromagnetic core 4, in which the technology according to the present invention may be applied or implemented. FIG. 2 shows the inside of the motor 1 with the permanent magnets 3 and the ferromagnetic core 4. As a person skilled in the art would appreciate, the motor 1 includes other parts and components that are not labeled or described, since they do not form part of the underlying invention disclosed herein. Moreover, the typical motor 1 is disclosed in relation to a typical AC motor, although the scope of the invention is intended to include implementation in relation to a DC motor, as well as a motor having a wound stator, etc.

The permanent magnets 3, ferromagnetic core 4, and motor housing 7 come together to form a magnetic circuit. This magnetic circuit creates a magnetic flux. In the ideal case, the magnetic flux leaves one pole of the top magnet, runs through the ferromagnetic core 4a, enters the bottom magnet, leaves through the bottom magnet's opposite pole, and finally returns to the top magnet's other pole through the motor housing 7, e.g., as shown in FIG. 3. (The reference to "top" and "bottom" are relative to the top of the Figure and the bottom of the figure in the drawing.)

In any real situation outside of the idealized case, the magnetic field created by the magnetic circuit may not be confined to the inside of the motor housing 7. Some of the flux leaves the motor housing 7 and uses the space surrounding the motor 1 as a return path through the magnets. By way of example, FIG. 4 shows the flux leakage that may appear outside of the motor housing 7.

By way of further example, the core may also be also shaped such that the flux pattern which is formed by the magnetic circuit changes with the rotation of the core during motor operation. When the magnetic flux enters or leaves the core, it does so at an angle perpendicular to the geometry of the core. By way of example, FIG. 5 shows flux lines leaving a typical core tooth.

This asymmetry in the flux leaving the core manifests as an uneven flux pattern on the outside of the motor housing 7. This flux pattern is periodic, can be detected, and is directly related to the rotation of the shaft. FIG. 6 shows the flux patterns on the outside of the motor housing 7 as the core rotates through three different angular positions, e.g., including the three different angular positions shown in FIGS. 6A, 6B and 6C.

In summary, considering a motor which is not ideal whose core has a geometry similar to that shown in FIG. 5, the magnetic field outside of the motor housing will change as a function of the angular position of the core. The present invention provides a method to determine the position of the core 4 and thus the motor shaft 2 by detecting this change in magnetic flux, shown in FIG. 6, with the use of a Hall Effect sensor 6, e.g., like that shown in FIG. 7 and described below in detail.

FIG. 7-15

According to some embodiments, the present invention may be composed of some combination of the motor 1, the shaft 2, the permanent magnets 3, the ferromagnetic core 4, a signal processor, microcontroller or signal processing module 102 with appropriate peripherals, e.g., like that shown in FIG. 22, and the Hall Effect sensor 6. By way of example, the signal processor, microcontroller or signal processing module 102 may also include, or form part of, a control circuit 32 shown in FIGS. 16 and 20. The appropriate peripherals may also include, or form part of, circuits or components 104 in FIG. 22.

As a person skilled in the art would appreciate, a Hall Effect sensor is known in the art and is a device which is used to measure a magnetic field. By way of example, FIG. 7 shows that the Hall Effect sensor 6 may be mounted externally on the motor housing 7 and configured to detect changes occurring in the magnetic field as the core rotates. The optimum position for the Hall Effect sensor 6 is dependent on the magnet position and the armature position at rest, and the scope of the invention is not intended to be limited to any particular position of the Hall Effect sensor 6. In operation, the Hall Effect sensor 6 is configured to sense the magnetic field being generated and provide or send a signal that is received by a signal processor, microcontroller or signal processing module 102 which can use the signal to determine, e.g., some combination of the number of rotations, the speed of the motor shaft rotation, or the acceleration of the motor shaft 2, etc.

However, in certain situations the signal from the Hall Effect sensor 6 can be affected by electromagnetic noise from the surrounding environment. By way of example, FIG. 8 illustrates how a signal from a noisy environment may appear. The dashed line represents how an ideal signal $V_i$ would behave in the absence of any external noise. The ideal signal $V_i$ would vary sinusoidally and could be compared to a reference voltage $V_R$, shown as a dash-dot line on FIG. 8, by a microcontroller like element 102 (FIG. 22) in order to determine the number of times a motor tooth has passed the Hall Effect sensor 6. Each time the voltage goes above and then below the reference voltage $V_R$ signifies that a tooth has passed the Hall Effect sensor 6.

In FIG. 8, the solid line represents what an actual signal V may look like at the input to the microcontroller like element 102 (FIG. 22). This signal V has picked up noise from its environment and the value of its voltage has changed. The noise shown in these figures is random, but it may not always be random. This noise presents a problem for the detection of passing teeth. By way of example, FIG. 9 shows a first cycle of FIG. 8 in greater detail. In FIG. 9, the random noise picked up by the signal V may cause the microcontroller like element 102 (FIG. 22) to falsely detect that a tooth has gone by the Hall Effect sensor 6. For example, this one pass of the tooth would be detected as two passes of a tooth.

The noise in the signal V presents a significant problem in the detection of the passing teeth. The present invention provides several methods or ways of reducing the noise in order to accurately detect the rotation of the motor. The first method involves cutting a slot 8 into the side of the motor housing 7 in which to place or arrange the Hall Effect sensor 6, as shown in FIG. 10, e.g., by externally mounting the Hall Effect sensor 6 on the outside of the motor housing 7. The slot 8 produces a leak in the magnetic field and provides a stronger signal with which to detect the effects mentioned above. By way of example, and as a person skilled in the art would appreciate, the slot 8 may be configured or formed as a narrow rectangular slot or groove that penetrates the motor housing 7 along the length of the motor housing, e.g., creating an opening. The scope of the invention is not intended to be limited to any particular dimensions of the rectangular slot or groove, e.g., in terms of its length and width, the dimensions of which may depend on the overall size of the motor, the overall strength of the magnetic field being sensed, etc.

Further to this, another method involves, e.g., also using a ferromagnetic bridge 9 that may be built above the Hall Effect sensor 6 to close the magnetic circuit and cause more flux to go through the Hall Effect sensor 6 contained between the ferromagnetic bridge 9 and the motor housing 7, e.g., as shown in FIG. 11. Note that FIGS. 10 and 11 are not drawn to scale and are used to clearly show the usage of these devices rather than how they would be physically arranged in an actual device utilizing the present invention disclosed herein. For example, a person skilled in the art would appreciate that the ferromagnetic bridge 9 may be physically mounted on the motor housing 7, e.g. using mounting techniques that are now known or later developed in the future, including using screws/bolts, epoxy, etc. Moreover, embodiments are also envisioned in which the ferromagnetic bridge 9 may be physically mounted on some other structure so as to be arranged or configured above, but not mounted physically on, the motor housing 7, e.g., using mounting techniques that are now known or later developed in the future, including using screws/bolts, epoxy, etc. Further, by way of example, and as a person skilled in the art would appreciate, the ferromagnetic bridge 9 may be configured or formed to extend and/or span the slot or groove 8, e.g., along at least some part of the length of the slot or groove 8. The scope of the invention is not intended to be limited to any particular dimensions of the ferromagnetic bridge 9, e.g., in terms of its length, width and height in relation to the slot or groove 8, the dimensions of which may depend on the overall size of the motor, the strength of the magnetic field being sensed, etc.

Moreover, and by way of further example, this embodiment of the present invention is disclosed using a Hall Effect sensor; however the scope of the invention is intended to include using any device capable of measuring a magnetic field that could be used, e.g., including other types or kinds of devices that are now known in the art or later developed in the future.

By way of further example, another method may involve, or take the form of, using electronic filtering components to remove transient signals from the sensor signal provided from the Hall Effect sensor. The scope of the invention is intended to include, and embodiments are envisioned using, electronic filtering components that are now known in the art or later developed in the future, including using signal smoothing filters, etc.

By way of yet further example, FIG. 13 shows another method that involves, or take the form of, creating a hole 8*a* in the motor housing 7 and mounting the Hall Effect sensor 6 inside the motor 1. In FIG. 13, the Hall Effect sensor 6 may be mounted, e.g., in or on a mounting assembly 4*b* that is arranged in relation to the permanent magnets 3 and the ferromagnetic core 4. By way of example, the Hall Effect sensor 6 may be mounted to some part of the mounting assembly 4*b* using fasteners/screws or epoxy. Moreover, the scope of the invention is not intended to be limited to how the Hall Effect sensor 6 is mounted inside the motor 1, including how the Hall Effect sensor 6 is mounted to the mounting assembly 4*b*. Embodiments are envisioned, and the scope of the invention is intended to include, mounting the Hall Effect sensor 6 inside the motor 1, including mounting the Hall Effect sensor 6 to the mounting assembly 4*b*, e.g., using other types or kinds of mounting techniques that are now known in the art or later developed in the future. Using this method, the random noise acquired by the signal from the Hall Effect sensor 6 may be minimized due to the motor housing 7 acting as a protective shield; and further the signal strength may be maximized due to the proximity of the Hall Effect sensor 6 with the components creating the signal. However, when the Hall Effect sensor 6 is mounted or placed internally inside the motor housing 7, there may be a time during which the magnetic field strength will sharply decrease due to the commutation of the motor 1. By way of example, FIG. 12 shows this dip in signal strength that could cause false readings. This issue can be alleviated by placing the Hall Effect sensor 6 in a certain position, e.g., like the position shown in FIG. 13. In order to position the Hall Effect sensor 6 in the position indicated in FIG. 13, the hole 8*a* can be drilled into, or formed in, the motor housing 7, e.g., like that shown in FIG. 14. When the Hall Effect sensor 6 is in this position, the signal from the Hall Effect sensor 6 will behave as is shown in FIG. 15 and will not interfere with the detection of the motor rotation. By way of example, FIG. 15 shows in the graph where the spike is no longer able to cause a false reading, e.g., due to the position of the Hall Effect sensor inside the motor housing 7 disclosed herein. Compare FIG. 15 to that shown in FIG. 12. Furthermore, embodiments are envisioned, and the scope of the invention is intended to include, mounting the Hall Effect sensor 6 inside the motor housing 7 with using a hole like 8*a*. By way of example, the Hall Effect sensor 6 may be mounted on the mounting assembly 4*b* before the mounting assembly 4*b* is arranged or slid inside the motor housing 7.

FIGS. 16-20

According to some embodiments of the present invention, precise motor control can be accomplished by using the output of the Hall Effect sensor 6 in a feedback loop with the motor control circuit 30, e.g., like that shown in FIG. 16. The motor control circuit 30 includes the control circuit 32, a motor 34, and a Hall Effect sensor 36, which are arranged in a feedback loop for implementing motor control. Consistent with that set forth above, the control circuit 32 may include, or take the form of, the signal processor, microcontroller or signal processing module 102 shown in FIG. 22. In operation, the control circuit 32 may be configured to receive inputs from a user along line 31 and the signal from the Hall Effect sensor 36 along the line 36*a*, and provide corresponding signal as control signaling along line 32*a* to control the operation of the motor 34. The motor 34 is configured to respond to the control signaling along line 32*a* and provide a motor output, which may be represented by line 34*a*, and also provides some form of electromagnetic signaling, e.g., containing a measured change of a magnetic field created by a magnetic circuit driving the motor 34, which may be represented by line 34*b*. The Hall Effect sensor 36 is configured to respond to the measured change of the magnetic field created by the magnetic circuit driving the motor 34 represented by line 34*b*, and provide the signal from the Hall Effect sensor 36 along the line 36*a*. In operation, the control circuit 32 can monitor the angular position, velocity, or acceleration of the motor 34 and can adjust the input to the motor 34 so that the motor 34 behaves in a manner which is desired by the user of the device. FIG. 16 shows this system represented by the feedback loop.

The system disclosed in this patent application can be used in various power systems including, but not limited to, alternating current, direct current, and pulse width modulated. When using AC power the speed of the pump can be regulated by measuring the speed of the motor, determining whether an increase or decrease in speed is required, and then determining and applying the appropriate duty cycle of the voltage waveform to achieve the desired power. Using this scheme the voltage should be applied when it is at its trough in its cycle in order to ramp the voltage up instead of suddenly applying the full voltage.

A pump can be connected to the motor to create a system in which fluid can be pumped accurately and controllably. In the following description, the motor 34 from the control circuit system 30 may be used to actuate a simple, idealized piston pump 10 shown in FIG. 17, but the concept could be employed in many different types of positive displacement pumps.

FIG. 17 shows the simple, idealized piston pump 10, having components as follows:
- A piston actuator 11, which is actuated by the motor 34 from the motor control circuit 30.
- A piston 12, which is considered rigid, rigidly connected to the piston actuator 11, and which forms a perfect seal with a pumping chamber 15.
- An inlet check valve 13 through which water can only flow into the pump 10.
- A pump inlet 14 in which fluid that flows through the check valve 13 enters the pumping chamber 15.
- A pump outlet 16 through which water exits the pump 10 and finally an outlet check valve 17 which will only allow water to exit the pump.

For the purpose of this discussion, one will also consider the fluid being pumped to be incompressible, although it need not be.

FIG. 18 shows the operation of the piston pump 10. FIG. 18A shows the pump at rest with both check valves 13, 17 closed. FIG. 18B shows that the piston actuator 11 moves positively in the vertical direction and the piston 12 moves along with it causing the volume of the pumping chamber 15 to increase. As the volume of the pumping chamber 15 is increasing, a pressure difference is created across the inlet check valve 13 ($P_{inlet} > P_{extension}$), which causes fluid to flow into the pumping chamber 15 across the inlet check valve 13. FIG. 18C shows that the piston actuator 11 begins pushing downward and decreases the volume of the pumping chamber 15, which causes the pressure in the pumping chamber 15 to increase until it exceeds the outlet pressure ($P_{compression} > P_{outlet}$) and opens the outlet check valve 17 allowing water to flow out of the pumping chamber 15. FIG. 18D shows the pump 10 at the end of one cycle of pumping.

In the simple idealized piston pump, the volume of fluid which will be displaced from the pump inlet 14 to the pump outlet 16 is exactly equal to the volume change of the pumping chamber 15 when the piston 11 is in its lower position to when it is in its upper position. This volume is the cross sectional area of the piston 11 perpendicular to the axis along the length of the piston actuator 11 multiplied by the distance traveled parallel to that axis by the piston 11 between its lower and upper position. The axis and vertical distance are displayed in FIG. 19.

The movement of the actuator is controlled by the motor 34 and is directly related to the rotational motion of the motor 34. As a person skilled in the art would appreciate, the transformation between the angular rotation of the motor 34 and linear translation of the piston actuator 11 can be accomplished in many ways, which will not be discussed here, since the scope of the invention is not intended to be limited to any particular way or manner of accomplishing such a transformation. By using the method of motor control disclosed above the linear translation of the piston 11 can be precisely controlled which in turn will precisely control the amount of fluid which flows through the pump 10. With the appropriate or suitable software in the control circuit 32, the present invention allows a user to select either a flow rate or a total amount of flow through a pump, e.g., consistent with that shown in whole or in part in FIG. 21 by way of example.

FIG. 20 shows the overall system 40, according to some embodiments of the present invention, which includes the pump control system 30 shown in 16 in combination with a pump 42 that responds to the motor output represented by line 34a, and provides a pump output represented by the line 42a, which may take the form of dispensing of the flow of fluids from the pump 42.

FIG. 21

Outside of the ideal case, the volume dispensed by the pump described will not likely be exactly equal to the change in volume described above. Factors like the flexibility of the piston, the leakage through the check valves, the slip between the motor and the actuator, and several other imperfections will result in a difference between the ideal pump and the actual pump. These differences will be exacerbated when the properties of the fluid being pumped is changed.

In order to further improve the accuracy of the system devices can be placed in the flow path to monitor the behavior of the fluid and feed this information back into the control system. Examples of such devices are flow meters, pressure gauges, temperature gauges, and any other device that measures a property of the fluid that can be used to increase the accuracy of the system.

The most straightforward of these devices is a flow-meter. By installing a flow-meter into this system and feeding its output into the control circuitry the effects of the varying motor speed can be directly correlated with a flow-rate and precise control of the flow can be achieved.

Another device that can be used is a temperature sensor. Fluid properties including density and viscosity are highly dependent on the temperature of a fluid and the flow rate of a pumping system is in turn highly dependent on these fluid properties. For a given fluid and pumping system an empirical equation or table of values can be used to correlate a temperature, voltage, and current draw with a flow-rate. A controller can use these values to accurately infer the amount of fluid being pumped through the system. By way of example, FIG. 21 shows a flow chart of a software procedure having steps 50a, 50b, 50c, 50d, 50e, $50e_1$, $50e_2$, 50f, $50f_1$, $50f_2$, $50f_3$, 50g and 50h that may be implemented according to some embodiments of the present invention.

FIG. 22: Signal Processor, Microcontroller, or Signal Processing Module 10a

By way of example, FIG. 22 shows the present invention in the form of apparatus 100, e.g., having a signal processor, microcontroller, or signal processing module 102.

The signal processor, microcontroller, or signal processing module 102 may be configured at least to receive signaling containing information about a measured change of a magnetic field created by a magnetic circuit driving a motor; and determine corresponding signaling containing information about the speed of rotation of the motor, based upon the signaling received, consistent with that set forth herein, and as shown in FIG. 22. By way of example, the signal processor, microcontroller, or signal processing control module 102 may include, or form part of, e.g. a printed circuit board assembly (PCBA).

The scope of the invention is intended to include the signal processor, microcontroller, or signal processing module 102 as a stand alone module or processor, as well as the signal processor, microcontroller, or signal processing module 102 forming part of a PCBA, or as part of some other signal processing module either now known or later developed in the future, etc.

According to some embodiment, the apparatus 100 may include one or more of the other features set forth herein, including the Hall Effect sensor 6 or 36, the magnetic circuit, the control circuit 32, the motor 1 or 34, the pump 42, etc. Embodiments are envisioned, and the scope of the invention is intended to include, the apparatus 100 including, or taking the form of, the control system like that shown in FIG. 16 and the pump control system like that shown in 20.

Signal Processor 102

By way of example, and consistent with that described herein, the functionality of the signal processor, microcontroller, or signal processing module 102 may be implemented to receive the signaling, process the signaling therein and/or determine the corresponding signaling, e.g., using hardware, software, firmware, or a combination thereof, although the scope of the invention is not intended to be limited to any particular embodiment thereof. In a typical software implementation, the signal processor, microcontroller, or signal processing module 102, may include, or take the form of, one or more microprocessor-based architectures having a microprocessor, a random access memory (RAM), a read only memory (ROM), input/output devices and control, data and address busing architecture connecting the same. A person skilled in the art would be able to program such a microprocessor-based implementation to perform the functionality set forth herein, as well as other functionality described herein without undue experimentation. The scope of the invention is not intended to be limited to any particular implementation using technology either now known or later developed in the future. Moreover, the scope of the invention is intended to include a signal processor as either part of the aforementioned apparatus, as a stand alone module, or in the combination with other components and/or circuitry for implementing another module.

By way of example, techniques for receiving signaling in such a signal processor, microcontroller, or signal processing module are known in the art, and the scope of the invention is not intended to be limited to any particular type or kind thereof either now known or later developed in the future. Based on this understanding, a person skilled in the art would appreciate, understand and be able to implement and/or adapt the signal processor, microcontroller, or signal processing module without undue experimentation so as to receive signaling containing information about a measured change of a magnetic field created by a magnetic circuit driving a motor, consistent with that set forth herein.

Techniques for determining one type of signaling based upon, or from, another type signaling received are also known in the art, and the scope of the invention is not intended to be limited to any particular type or kind thereof either now known or later developed in the future. Based on this understanding, a person skilled in the art would appreciate, understand and be able to implement and/or adapt the signal processor, microcontroller, or signal processing module without undue experimentation so as to determine corresponding signaling containing information about the speed of rotation of the motor, based upon the signaling received, consistent with that set forth herein.

Techniques for providing signaling from a signal processor such as module 10a are also known in the art, and the scope of the invention is not intended to be limited to any particular type or kind thereof either now known or later developed in the future. Based on this understanding, a person skilled in the art would appreciate, understand and be able to implement and/or adapt the signal processor, microcontroller, or signal processing module without undue experimentation so as to provide the corresponding signaling as control signaling containing information to control the operation of the motor, consistent with that set forth herein.

It is also understood that the apparatus 100 may include one or more other signal processor circuits or components 104 for implementing other functionality associated with the underlying apparatus that does not form part of the underlying invention, and thus is not described in detail herein. By way of example, the one or more other modules, components, processing circuits, or circuitry may include random access memory, read only memory, input/output circuitry and data and address buses for use in relation to implementing the signal processing functionality of the signal processor, or devices or components, etc.

Possible Applications

This technology could be used in any application which requires precise motor control or precise control of a fluid through a pump. The pump described in this disclosure is a piston pump but the system can be used on any pump which displaces a fluid and is actuated by an electric motor. This may include, but is not limited to, the following:
Piston pumps,
Diaphragm pumps,
Lobe pumps,
Sliding vane pumps,
Gear pumps,
Centrifugal pumps and
Flexible impeller pumps.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:
1. Apparatus comprising:
a signal processor, microcontroller or signal processing module configured at least to:
receive signaling containing information about a measured change of a magnetic field created by a magnetic circuit driving a motor, the magnetic circuit having some combination of a stator, a rotor, and a motor housing, including where the stator and the rotor comprises permanents magnets and ferromagnetic core, or including where the stator is a wound stator, or where the motor is an AC or DC motor;

determine corresponding signaling containing information about the speed of rotation of the motor, based upon the signaling received; and a Hall Effect Sensor mounted externally to the motor housing and configured to sense some part of the magnetic field that leaves the motor housing, including being mounted on an external surface of the motor housing, the motor housing being configured or formed with a slot therein that is cut into the motor housing to allow configured, mounted or placed in relation to the slot to detect the magnetic flux leakage passing through the slot in the motor housing.

2. Apparatus according to claim 1, wherein the signal processor, microcontroller or signal processing module is configured to provide the corresponding signaling as control signaling containing information to control the operation of the motor, including where the motor control is used to control the flow of fluids from a pump.

3. Apparatus according to claim 2, wherein
the apparatus comprises a control circuit that includes the signal processor, microcontroller or signal processing module in combination with the Hall Effect Sensor in a feedback loop; and
the Hall Effect Sensor is configured to sense the measured change of the magnetic field created by the magnetic circuit driving the motor and provide the signaling containing information about the measured change.

4. Apparatus according to claim 2, wherein
the apparatus comprises a pump configured to respond to the corresponding signaling and pump the fluid to be pumped, including where the pump is a piston or diaphragm pump.

5. Apparatus according to claim 1, wherein the Hall Effect Sensor is configured to sense magnetic flux and provide the signaling in the form of a feedback signal for implementing motor control.

6. Apparatus according to claim 1, wherein the apparatus comprises a pump having the motor and also having a control system configured with the signal processor, microcontroller or signal processing module for controlling the operation of the pump for controlling the dispensing of the flow of fluids from the pump.

7. Apparatus according to claim 1, wherein the signal processor, microcontroller or signal processing module is configured to determine the position of the ferromagnetic core by detecting the measured change of the magnetic field.

8. Apparatus according to claim 1, wherein the magnetic circuit comprises a ferromagnetic bridge built above the Hall Effect sensor to close the magnetic circuit and cause more flux to go through the Hall Effect sensor contained between the ferromagnetic bridge and the motor housing.

9. Apparatus according to claim 8, wherein the ferromagnetic bridge is configured above the Hall Effect sensor, including being mounted on the motor housing above the Hall Effect sensor.

10. Apparatus comprising:
a signal processor, microcontroller or signal processing module configured at least to:
receive signaling containing information about a measured change of a magnetic field created by a magnetic circuit driving a motor, the magnetic circuit having some combination of a stator, a rotor, and a motor housing, including where the stator and the rotor comprises permanents magnets and ferromagnetic core, or including where the stator is a wound stator, or where the motor is an AC or DC motor;
determine corresponding signaling containing information about the speed of rotation of the motor, based upon the signaling received;
wherein the motor housing is configured with a cut or slot formed therein that produces a leak in the magnetic field, and the apparatus comprises a Hall Effect Sensor configured in relation to the cut or slot to sense the leak in the magnetic field.

11. Apparatus according to claim 10, wherein the signal processor, microcontroller or signal processing module is configured to provide the corresponding signaling as control signaling containing information to control the operation of the motor, including where the motor control is used to control the flow of fluids from a pump.

12. Apparatus comprising:
a signal processor, microcontroller or signal processing module configured at least to:
receive signaling containing information about a measured change of a magnetic field created by a magnetic circuit driving a motor, the magnetic circuit having some combination of a stator, a rotor, and a motor housing, ferromagnetic core, or including where the stator is a wound stator, or where the motor is an AC or DC motor;
determine corresponding signaling containing information about the speed of rotation of the motor, based upon the signaling received; and
a Hall Effect Sensor mounted externally to the motor housing and configured to sense some part of the magnetic field that leaves the motor housing, including being mounted on an external surface of the motor housing;
the magnetic circuit having a ferromagnetic bridge built above the Hall Effect sensor to close the magnetic circuit and cause more flux to go through the Hall Effect sensor contained between the ferromagnetic bridge and the motor housing.

13. Apparatus comprising:
a signal processor, microcontroller or signal processing module configured at least to:
receive signaling containing information about a measured change of a magnetic field created by a magnetic circuit driving a motor, the magnetic circuit having some combination of a stator, a rotor, and a motor housing, including where the stator and the rotor comprises permanents magnets and ferromagnetic core, or including where the stator is a wound stator, or where the motor is an AC or DC motor; and
determine corresponding signaling containing information about the speed of rotation of the motor, based upon the signaling received;
wherein the motor housing is configured or formed with a hole therein, and the apparatus comprises a Hall Effect sensor that is mounted internally inside the motor, including through the hole.

14. Apparatus according to claim 13, wherein the apparatus comprises a mounting assembly arranged in relation to the permanent magnets and the ferromagnetic core, and the Hall Effect sensor is mounted to some part of the mounting assembly.

15. Apparatus according to claim 13, wherein the random noise acquired by the signal from the Hall Effect sensor is minimized due to the motor housing acting as a protective shield, and the signal strength is maximized due to the proximity of the Hall Effect sensor with components creating the signal.

16. Apparatus according to claim 13, wherein the signal processor, microcontroller or signal processing module is configured to provide the corresponding signaling as control signaling containing information to control the operation of the motor, including where the motor control is used to control the flow of fluids from a pump.

17. A method comprising:
receiving with a signal processor, microcontroller or signal processing module signaling containing information about a measured change of a magnetic field created by a magnetic circuit driving a motor, the magnetic circuit having some combination of a stator, a rotor, and a motor housing, including where the stator and the rotor comprises permanents magnets and ferromagnetic core, or including where the stator is a wound stator, or where the motor is an AC or DC motor;
determining with the signal processor, microcontroller or signal processing module corresponding signaling containing information about the speed of rotation of the motor, based upon the signaling received;
mounting externally a Hall Effect Sensor to the motor housing that is configured to sense some part of the magnetic field that leaves the motor housing, including being mounted on an external surface of the motor housing;
configuring or forming in the motor housing a slot that is cut into the motor housing to allow magnetic flux leakage through the motor housing; and
configuring, mounting or placing the Hall Effect sensor in relation to the slot to detect the magnetic flux leakage passing through the slot in the motor housing.

18. A method according to claim 17, wherein the method comprises providing with the signal processor, microcontroller or signal processing module the corresponding signaling as control signaling containing information to control the operation of the motor, including where the motor control is used to control the flow of fluids from a pump.

19. A method comprising:
receiving with a signal processor, microcontroller or signal processing module signaling containing information about a measured change of a magnetic field created by a magnetic circuit driving a motor, the magnetic circuit having some combination of a stator, a rotor, and a motor housing, including where the stator and the rotor comprises permanents magnets and ferromagnetic core, or including where the stator is a wound stator, or where the motor is an AC or DC motor;
determining with the signal processor, microcontroller or signal processing module corresponding signaling containing information about the speed of rotation of the motor, based upon the signaling received;
configuring the motor housing with a cut or slot formed therein that produces a leak in the magnetic field; and
configuring a Hall Effect Sensor in relation to the cut or slot to sense the leak in the magnetic field.

20. A method according to claim 19, wherein the method comprises providing with the signal processor, microcontroller or signal processing module the corresponding signaling as control signaling containing information to control the operation of the motor, including where the motor control is used to control the flow of fluids from a pump.

21. A method comprising:
receiving with a signal processor, microcontroller or signal processing module signaling containing information about a measured change of a magnetic field created by a magnetic circuit driving a motor, the magnetic circuit having some combination of a stator, a rotor, and a motor housing, including where the stator and the rotor comprises permanents magnets and ferromagnetic core, or including where the stator is a wound stator, or where the motor is an AC or DC motor;
determining with the signal processor, microcontroller or signal processing module e corresponding signaling containing information about the speed of rotation of the motor, based upon the signaling received;
configuring or forming the motor housing with a hole therein; and
mounting internally a Hall Effect sensor inside the motor, including through the hole.

22. A method according to claim 21, wherein the method comprises providing with the signal processor, microcontroller or signal processing module the corresponding signaling as control signaling containing information to control the operation of the motor, including where the motor control is used to control the flow of fluids from a pump.

* * * * *